United States Patent
Mizawa et al.

(10) Patent No.: US 9,817,350 B2
(45) Date of Patent: Nov. 14, 2017

(54) POSITIONAL DEVIATION CORRECTION PATTERN, METHOD OF FORMING POSITIONAL DEVIATION CORRECTION PATTERN, AND IMAGE FORMING APPARATUS

(71) Applicants: Junichi Mizawa, Kanagawa (JP); Masato Mukai, Kanagawa (JP); Toru Ohmine, Kanagawa (JP); Ichiro Komuro, Tokyo (JP); Shuuichi Endoh, Saitama (JP); Kenji Sato, Kanagawa (JP); Yasuko Yoshikawa, Kanagawa (JP)

(72) Inventors: Junichi Mizawa, Kanagawa (JP); Masato Mukai, Kanagawa (JP); Toru Ohmine, Kanagawa (JP); Ichiro Komuro, Tokyo (JP); Shuuichi Endoh, Saitama (JP); Kenji Sato, Kanagawa (JP); Yasuko Yoshikawa, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 14/968,085

(22) Filed: Dec. 14, 2015

(65) Prior Publication Data
US 2016/0170354 A1    Jun. 16, 2016

(30) Foreign Application Priority Data

Dec. 15, 2014    (JP) .................................. 2014-252954
Dec. 3, 2015    (JP) .................................. 2015-236799

(51) Int. Cl.
G03G 15/00    (2006.01)
H04N 1/113    (2006.01)
H04N 1/06    (2006.01)

(52) U.S. Cl.
CPC ......... G03G 15/50 (2013.01); G03G 15/5041 (2013.01); H04N 1/06 (2013.01); H04N 1/113 (2013.01)

(58) Field of Classification Search
CPC ...................... G03G 15/5041; G03G 15/5058
See application file for complete search history.

(56) References Cited

U.S. PATENT DOCUMENTS 5,627,649 A    5/1997    Sawayama et al.
5,729,353 A    3/1998    Sawayama et al.
(Continued)

FOREIGN PATENT DOCUMENTS

JP    01-112266    4/1989

OTHER PUBLICATIONS

U.S. Appl. No. 07/959,094, filed Oct. 9, 1992.

*Primary Examiner* — Sevan A Aydin
(74) *Attorney, Agent, or Firm* — Harness, Dickey & Pierce, P.L.C.

(57) ABSTRACT

A positional deviation correction pattern includes a first and second pattern image portions adjacent in a sub-scanning direction at the same position in a main-scanning direction, with the same width in the main-scanning direction. Each image portion includes a first side extending in the sub-scanning direction, a second side continuing from one end of the first side and extending in a direction intersecting the sub-scanning direction, and a third side continuing from the other end and extending in a direction intersecting both the sub-scanning direction and the second side. The second sides have the same inclination angle to a virtual line parallel to the main-scanning direction. The third sides have the same inclination angle to the virtual line. A length of one image portion in the sub-scanning direction gradually increases from one end to the other end in the main-scanning (Continued)

direction, a length of the other image portion gradually decreases.

13 Claims, 23 Drawing Sheets

(56) References Cited

U.S. PATENT DOCUMENTS

| | | | | |
|---|---|---|---|---|
| 6,275,244 | B1* | 8/2001 | Omelchenko | G03G 15/0152 |
| | | | | 346/116 |
| 6,300,968 | B1* | 10/2001 | Kerxhalli | G03G 15/0152 |
| | | | | 347/116 |
| 6,993,275 | B2* | 1/2006 | Mitsuya | G03G 15/0194 |
| | | | | 347/116 |
| 9,211,722 | B2* | 12/2015 | Yoneyama | B41J 2/205 |
| 2003/0210412 | A1 | 11/2003 | Ishibashi | |
| 2007/0217831 | A1 | 9/2007 | Maeda | |
| 2008/0043299 | A1 | 2/2008 | Ikeda | |
| 2009/0067858 | A1 | 3/2009 | Ishibashi | |
| 2009/0074476 | A1 | 3/2009 | Miyadera | |
| 2009/0080915 | A1* | 3/2009 | Hashimoto | G03G 15/0131 |
| | | | | 399/39 |
| 2015/0277262 | A1* | 10/2015 | Nakashima | G03G 15/5058 |
| | | | | 399/38 |

\* cited by examiner

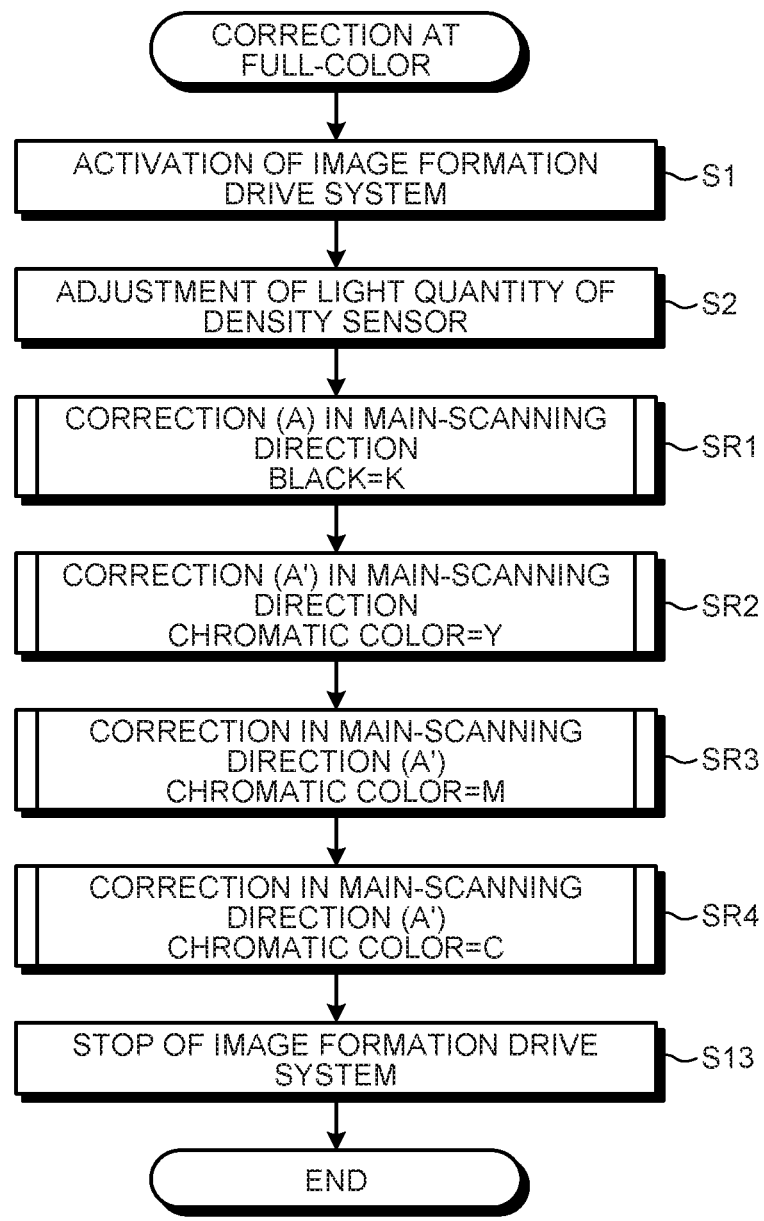

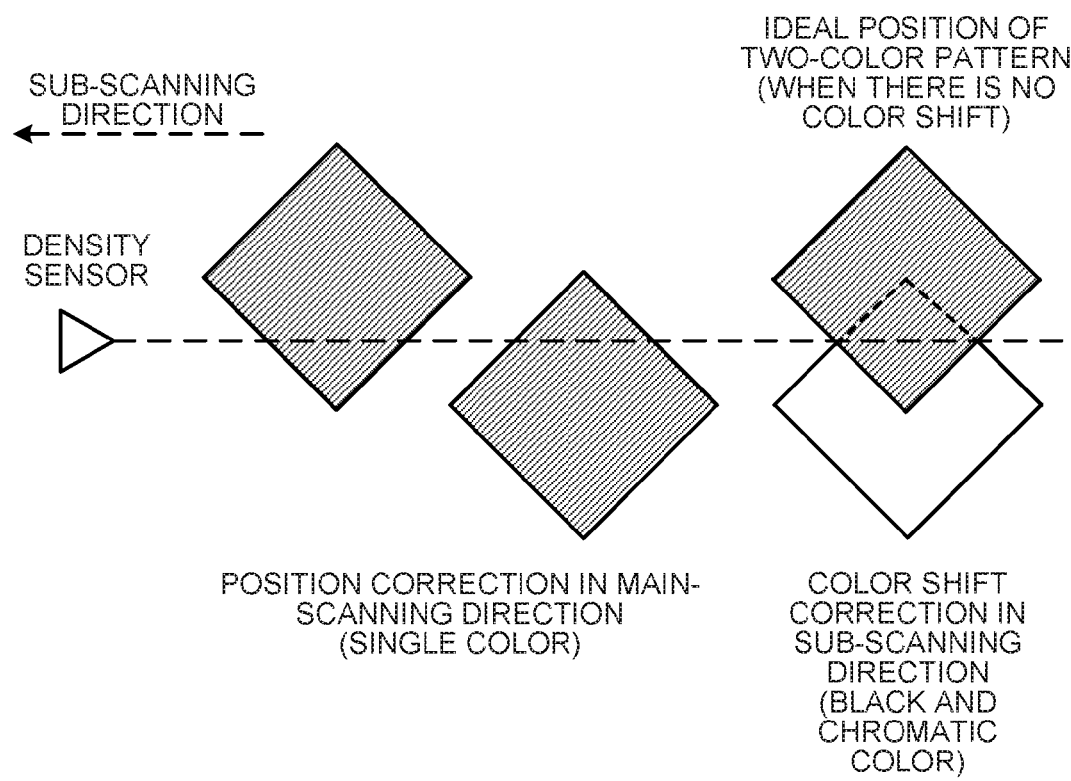

POSITIONAL DEVIATION CORRECTION PATTERN, METHOD OF FORMING POSITIONAL DEVIATION CORRECTION PATTERN, AND IMAGE FORMING APPARATUS

CROSS-REFERENCE TO RELATED APPLICATIONS

The present application claims priority to and incorporates by reference the entire contents of Japanese Patent Application No. 2014-252954 filed in Japan on Dec. 15, 2014 and Japanese Patent Application No. 2015-236799 filed in Japan on Dec. 3, 2015.

BACKGROUND OF THE INVENTION

1. Field of the Invention

The present invention relates to a positional deviation correction pattern, a method of forming a positional deviation correction pattern, and an image forming apparatus.

2. Description of the Related Art

In various image forming apparatuses such as an electrophotographic apparatus and an inkjet recording apparatus, it is important to form an image at a correct position with respect to an image bearer such as a photoconductor, an intermediate transfer body, and a recording sheet without a deviation.

Japanese Laid-open Patent Publication No. H01-112266 discloses an image forming apparatus in which a pattern image for a positional deviation correction is formed on an image bearer to correct a positional deviation of an image, and a position of the pattern image formed is detected by a reflective photo-sensor. In the image forming apparatus, the amount of deviation between an actual drawing position and an ideal drawing position of the image in a main-scanning direction is calculated from a length of the pattern image in the sub-scanning direction, which is detected by the photo-sensor. The image forming apparatus corrects a main-scanning direction position of the image by adjusting a drawing position of the image based on the amount of deviation calculated.

In a case where the pattern image for correction is detected by the reflective photo-sensor, a threshold is set with respect to an output voltage of the photo-sensor. For example, when a voltage value lower than the threshold is output, the image forming apparatus determines that the pattern image for correction of the positional deviation is detected. However, there is an error between timing at which an edge portion of the pattern image passes through the photo-sensor, and timing at which the photo-sensor detects the edge portion of the pattern image. This error varies in accordance with an environment temperature when the pattern image is detected, a density of the pattern image, a color of the pattern image, a contamination degree of a light-receiving unit of the photo-sensor, and the like. When an output error of the photo-sensor varies, there is a problem in that detection accuracy of the length of the pattern image in the sub-scanning direction, and positional deviation correction accuracy decreases.

Therefore, there is a need for a positional deviation correction pattern by which a positional deviation of an image can be detected with accuracy in a simple configuration, a method of forming the positional deviation correction pattern, and an image forming apparatus that uses the positional deviation correction pattern.

SUMMARY OF THE INVENTION

It is an object of the present invention to at least partially solve the problems in the conventional technology.

According to an embodiment, a positional deviation correction pattern is to be formed on an image bearer by an image forming unit provided in an image forming apparatus. The positional deviation correction pattern includes a first pattern image portion and a second pattern image portion. The first pattern image portion and the second pattern image portion are disposed to be adjacent to each other in a sub-scanning direction of the image bearer, are solid-filled, are disposed in the same position in a main-scanning direction, and have the same width in the main-scanning direction. Each of the first pattern image portion and the second pattern image portion includes a first side that extends in parallel with the sub-scanning direction, a second side that continues from one end of the first side and extends in a direction that intersects the sub-scanning direction, and a third side that continues from the other end of the first side and extends in a direction that intersects both the sub-scanning direction and the second side. The second sides of the first and second pattern image portions have the same inclination angle with respect to a virtual line parallel to the main-scanning direction. The third sides of the first and second pattern image portions have the same inclination angle with respect to the virtual line. When a length of one of the first and second pattern image portions in the sub-scanning direction gradually increases from one end to the other end in the main-scanning direction, a length of the other of the first and second pattern image portions in the sub-scanning direction gradually decreases.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 13 is a flowchart illustrating an operation of correcting the positional deviation in the main-scanning direction in a case where an image formed has four colors;

FIG. 26A is a view illustrating an example of the positional deviation correction pattern formed on the image bearer.

DETAILED DESCRIPTION OF THE PREFERRED EMBODIMENTS

In an embodiment of the invention, two pattern images for positional deviation correction, which are adjacent to each other in a sub-scanning direction, are formed on an image bearer so as to cancel a detection error due to a deviation of output characteristics of a sensor that detects the pattern images, thereby achieving positional deviation correction with high accuracy.

The embodiment will be described in detail with reference to the accompanying drawings. However, constituent elements, types, combinations, shapes, relative arrangements, and the like which are described in this embodiment do not limit the scope of the invention and are merely examples unless otherwise stated.

Image Forming Apparatus

Figure 1:
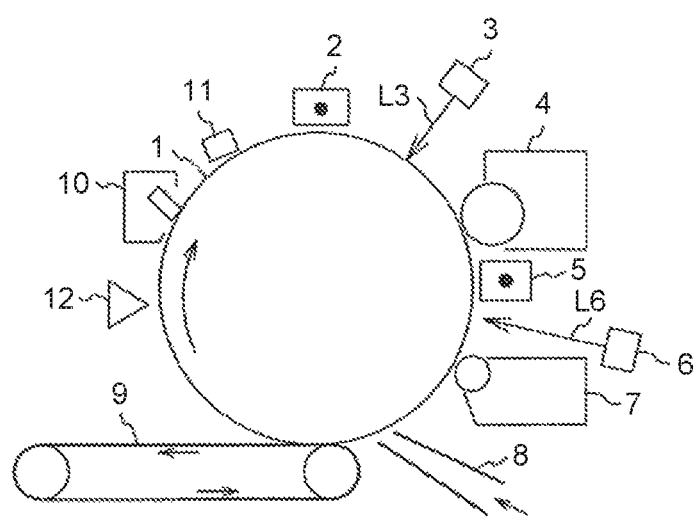
FIG. 1 is a schematic view illustrating a configuration of the periphery of a photoconductor of an image forming apparatus according to one embodiment of the invention.

FIG. 1 is a schematic view illustrating a configuration of the vicinity of a photoconductor of an image forming apparatus according to one embodiment of the invention. The image forming apparatus illustrated in the drawing is an electrophotographic type image forming apparatus that forms a two-color digital image through reversal developing.

The image forming apparatus includes a drum-shaped (cylindrical) photoconductor 1 as an image bearer that bears an electrostatic latent image and a toner image on a surface thereof. As a unit (first image forming unit) that forms a toner image of a first color, a first charging device 2, a first exposure device 3, and a first developing device 4 are disposed at the periphery of the photoconductor 1. In addition, as a unit (second image forming unit) that forms a toner image of a second color different from the first color, a second charging device 5, a second exposure device 6, and a second developing device 7 are disposed at the periphery of the photoconductor 1 downstream of the first image forming unit. In addition, a transfer device 9, a cleaning device 10, and an erasing light source 11 are disposed at the periphery of the photoconductor 1 downstream of the second image forming unit. In addition, a density sensor 12 (pattern detection unit) is disposed between the transfer device 9 and the cleaning device 10.

Description will be given of operations of respective portions, and an image forming process.

First, the first charging device 2 uniformly charges a surface of the photoconductor 1 in preparation for first developing. The first exposure device 3 irradiates the surface of the photoconductor 1 with laser light L3 based on an image signal to form a first electrostatic latent image. For example, the image signal is a signal of an original document image read by a scanner. The first developing device 4 develops the first electrostatic latent image with a toner of a first color to form a toner image of the first color.

The second charging device 5 uniformly charges the surface of the photoconductor 1 in preparation for second developing. The second exposure device 6 irradiates the surface of the photoconductor 1 with laser light L6 based on an image signal to form a second electrostatic latent image. The second developing device 7 develops the second electrostatic latent image with a toner of a second color to form a toner image of the second color.

The transfer device 9 transfers the toner images of the first color and the second color to a recording sheet (recording medium) transported from a paper feeding conveyance path 8. The transfer device 9 provides a charge, which has a polarity reversed from that of a charge of a toner, from a rear surface side of the recording sheet to transfer a toner image borne on the photoconductor 1 to the recording sheet. The cleaning device 10 removes the toner that remains on the photoconductor 1 after transfer of the toner image. The erasing light source 11 is a neutralization device and removes a charge on the surface of the photoconductor 1 in preparation for the subsequent image formation.

The density sensor 12 detects the amount of the toner attached to the electrostatic latent image borne on the photoconductor 1, that is, the density of the toner image. Further, a toner pattern for density detection which is detected by the density sensor 12, or the other toner patterns are formed on a region (non-transfer region) of the photoconductor 1 other than a region on which the toner image to be transferred to recording sheet is borne. For example, the non-transfer region is provided at an end of the photoconductor 1 in a main-scanning direction.

Further, in the photoconductor 1, a charge generation layer and a charge transportation layer are sequentially laminated on a peripheral surface of a drum-shaped (cylindrical) conductive main body. The photoconductor 1 is rotatably supported, and is driven to rotate in a constant direction by a drive unit, for example, at a linear velocity of 250 mm/sec.

Control System

Figure 2:
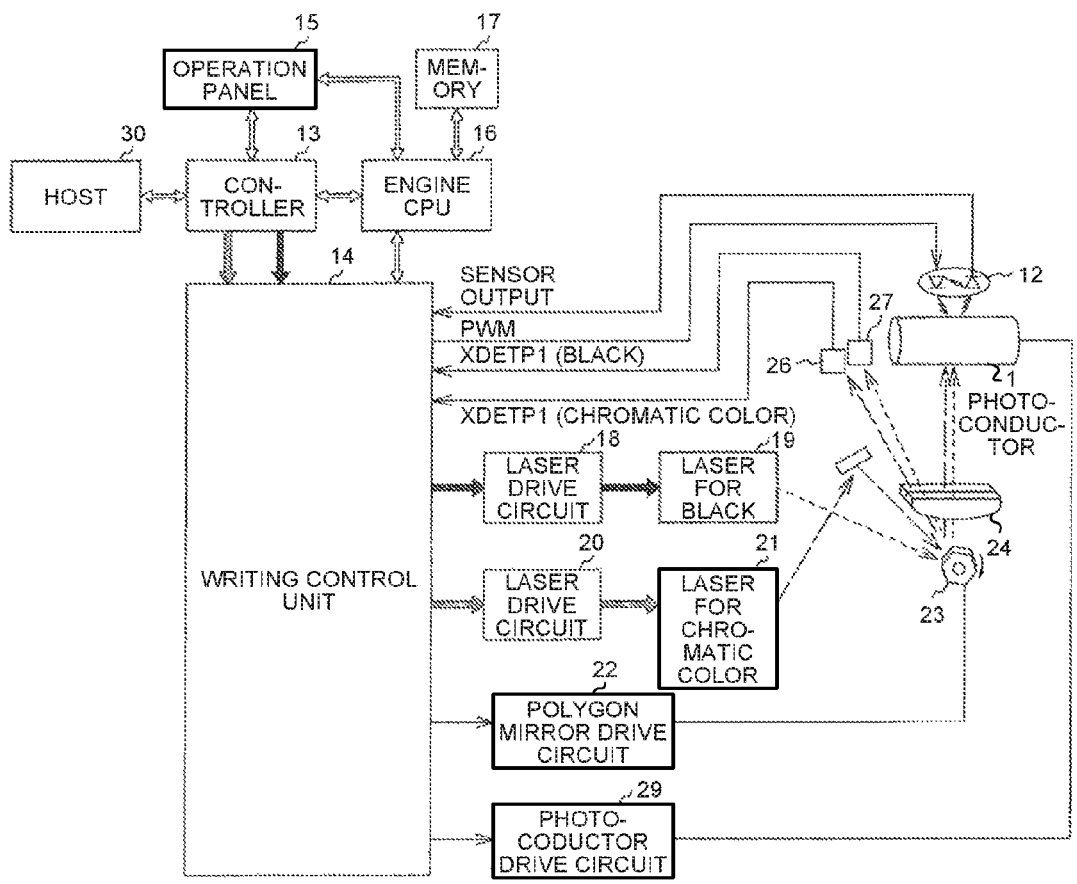
FIG. 2 is a functional block diagram schematically illustrating a control system of the image forming apparatus according to one embodiment of the invention.
Figure 3:
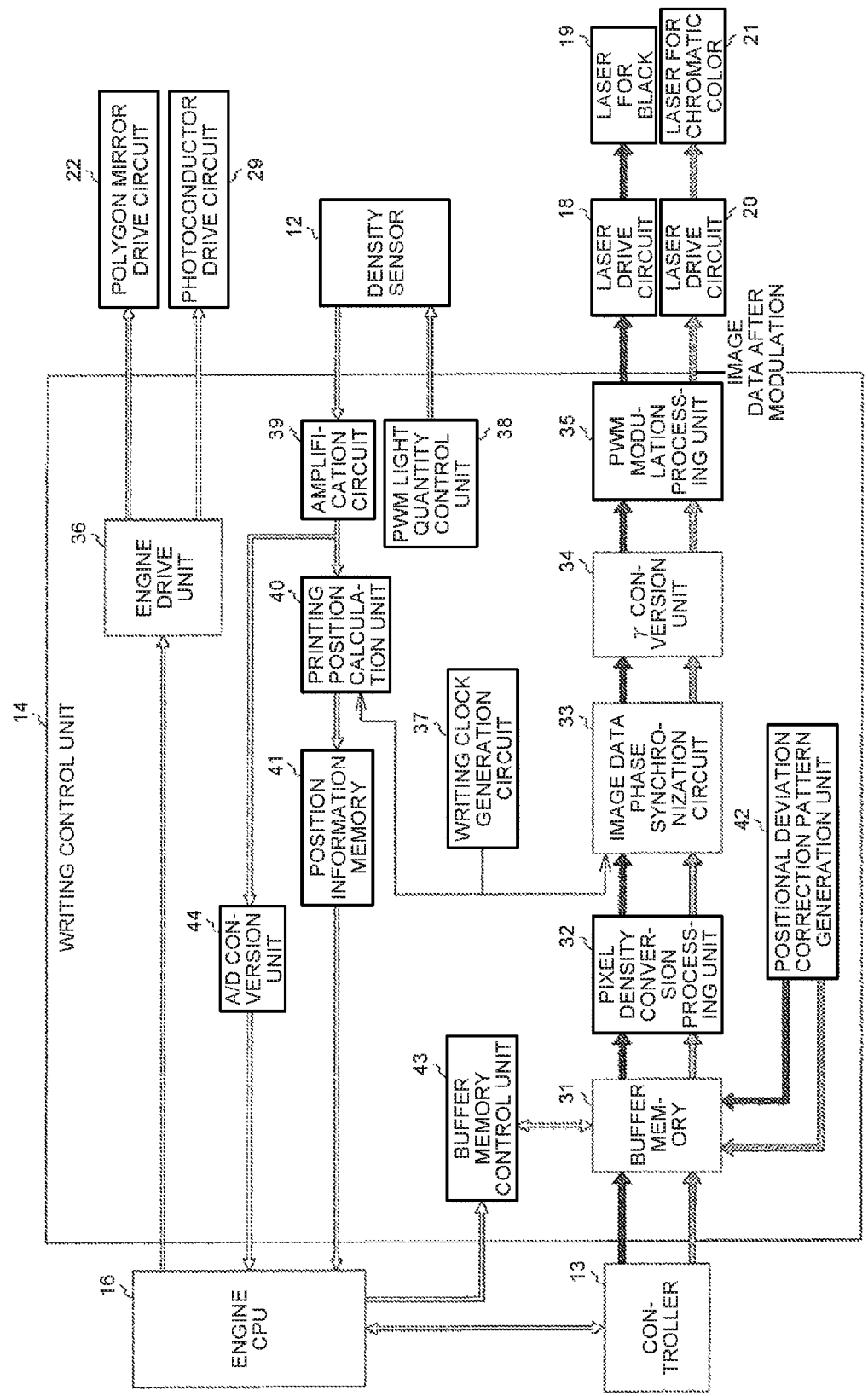
FIG. 3 is a functional block diagram schematically illustrating a writing control unit according to one embodiment of the invention.

FIG. 2 is a functional block diagram schematically illustrating a control system of the image forming apparatus according to one embodiment of the invention. FIG. 3 is a functional block diagram schematically illustrating a writing control unit according to one embodiment of the invention. FIG. 2 illustrates a representative configuration of the control system of the image forming apparatus. FIG. 3 schematically illustrates an inner processing block diagram of a writing control unit 14 in FIG. 2.

A host 30 is a computer device that issues a print command, and transmits image information of various images to a controller 13. A scanner, a FAX, and the like also correspond to the host 30.

The controller 13 receives image information from the host 30, develops the image information to image data, and transmits the image data of respective colors (for example, a black color and a chromatic color) to the writing control unit 14.

An operation panel 15 is a portion which is used by a user to set a print mode, or on which an error state is displayed to inform the user of the error state.

An engine CPU (central processing unit) 16 performs the entirety of management of the image forming apparatus such as control of the controller 13, control of a drive unit, and setting of print conditions to the writing control unit 14.

A memory 17 is a work memory (random access memory (RAM)) of the engine CPU 16, and stores program data used for the engine CPU 16 to perform a variety of control, a state value of a control variable under management of the engine CPU 16, and the like.

The writing control unit 14 converts plural pieces of image data of two colors of red and white, which are received from the controller 13, to a data width modulation signal for laser lighting, and transmits the signal to laser drive circuits 18 and 20.

A writing clock generation circuit 37, which constitutes the writing control unit 14, generates a pixel clock of a writing frequency corresponding to a pixel density during generation of an electrostatic latent image on the photoconductor 1.

The plural pieces of image data of two colors of red and black, which are received from the controller 13, are stored in a buffer memory 31 of the writing control unit 14.

The buffer memory 31 is a memory that temporarily stores the plural pieces of image data of the respective colors which are transmitted from the controller 13 to perform buffering of absorbing a difference in data transmission speed between the plural pieces of image data. The plural pieces of image data of the respective colors are temporarily stored in the buffer memory 31 to perform timing matching so that images of respective colors can be printed at a correct positional relationship.

A buffer memory control unit 43 performs read and write control of image data inside the buffer memory 31 based on printing timing information of plural pieces of image data of respective colors which are received from the engine CPU 16.

A pixel density conversion processing unit 32 performs a process of converting a pixel density of image data transmitted from the controller 13 into a pixel density during forming an electrostatic latent image on the photoconductor 1.

An image data phase synchronization circuit 33 performs a process of synchronizing the image data, which is output from the pixel density conversion processing unit 32, with a pixel clock transmitted from the writing clock generation circuit 37.

A γ conversion unit 34 performs a process of combining a gray scale and a color tone of a toner image, which is printed on a recording sheet, with original image data.

A PWM modulation processing unit 35 converts the image data, which is output from the γ conversion unit 34, into a data width modulation signal for lighting of a laser light source based on a γ conversion value.

The data width modulation signal, which is output from the PWM modulation processing unit 35, is input to the laser drive circuits 18 and 20 for respective colors.

The laser drive circuits 18 and 20 drive a laser 19 for black and a laser 21 for a chromatic color (here, a laser for red) based on the data width modulation signal. The laser 19 for black and the laser 21 for a chromatic color irradiate the photoconductor 1 with laser light to form an electrostatic latent image on the surface of the photoconductor 1.

An engine drive unit 36 generates a polygon clock that determines the number of revolutions of a polygon motor, and transmits the polygon clock to a polygon mirror drive circuit 22. In addition, the engine drive unit 36 generates a PWM signal that drives the photoconductor 1 at a predetermined number of revolutions, for example, at a linear velocity of 250 mm/sec, and transmits the PWM signal to a photoconductor drive circuit 29.

The polygon mirror drive circuit 22 drives and controls the polygon motor that rotates a polygon mirror 23 based on a polygon clock.

The polygon mirror 23 is a polyhedral mirror that deflects laser light, which is generated by the laser 19 for black and the laser 21 for a chromatic color, at a constant angular velocity.

An f-θ lens 24 deflects laser light, which is deflected at a constant angular velocity by the polygon mirror 23, at a constant velocity.

The photoconductor drive circuit 29 drives and controls of the photoconductor motor that rotates the photoconductor 1 based on the PWM signal.

An electrostatic latent image is formed on the surface of the photoconductor 1 with the laser light deflected at a constant velocity by the f-θ lens 24.

Light detectors 26 and 27 illustrated in FIG. 2 detect laser light on a scanning initiation side, and outputs a signal XDETP that sets scanning initiation time in a main-scanning direction of the photoconductor 1 with the laser light.

A positional deviation correction pattern generation unit 42 confirms an image formation position with a black toner, and an image formation position with a chromatic color toner, and generates a positional deviation correction pattern for correction of an image formation position as necessary. The positional deviation correction pattern is formed on the photoconductor 1 for each toner color. A formation position of the positional deviation correction pattern of each color which is formed on the photoconductor 1 is detected by the density sensor 12.

The density sensor 12 is a reflective photo-sensor, and includes a light-emitting element (light-receiving unit) such as an LED, and a light-receiving element such as a photo-diode. The light-emitting element irradiates the surface of the photoconductor 1 with light, and the light-receiving element receives light reflected from the photoconductor 1. A light quantity of light used for irradiation by the light-emitting element is controlled by a PWM light quantity control unit 38 inside the writing control unit 14. In addition, the light-receiving element outputs a voltage signal based on the reflected light received to an amplification circuit 39 of the writing control unit 14 as a sensor output. The density sensor 12 outputs a voltage signal that represents presence and absence and a density of a toner image on the surface of the photoconductor 1.

The amplification circuit 39 amplifies the voltage signal output from the density sensor 12, and transmits the resultant amplified signal to a printing position calculation unit 40 and an A/D conversion unit 44.

The printing position calculation unit 40 determines whether or not the positional deviation correction pattern of each color is present based on the voltage signal received from the density sensor 12 through the amplification circuit 39. In a case where the positional deviation correction pattern is detected, the printing position calculation unit 40 obtains a formation position of the positional deviation correction pattern through calculation, and stores a calculation result (printing position information) in a position information memory 41. The calculation result (printing position information) is further transmitted from the position information memory 41 to the engine CPU 16.

The engine CPU 16 (positional deviation correction amount calculating unit) calculates a correction value (correction amount) for positional deviation for black and a correction value for positional deviation for a chromatic color based on the printing position information received from the printing position calculation unit 40. Hereinafter, the correction value for positional deviation is referred to as a positional deviation correction value. The engine CPU 16 appropriately delays read-out timing of the image data for black and the image data for red from the buffer memory 31 based on the positional deviation correction value to perform positional deviation correction.

The A/D conversion unit 44 converts an analog voltage signal, which is amplified by the amplification circuit 39, into a digital signal, and transmits the digital signal to the engine CPU 16.

The engine CPU 16 manages the amount of toner attached to the surface of the photoconductor 1 based on the digital sensor voltage signal.

Positional Deviation Correction Pattern and Sensor Waveform—1

Figure 4:
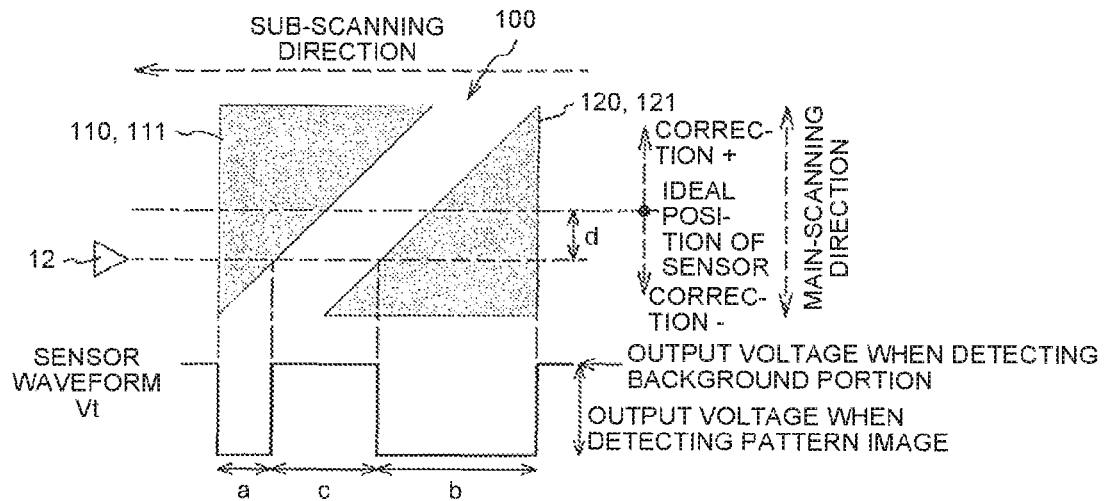
FIG. 4 is a view illustrating an example of a positional deviation correction pattern and an ideal sensor waveform according to one embodiment of the invention.

FIG. 4 is a view illustrating an example of the positional deviation correction pattern and an ideal sensor waveform according to one embodiment of the invention. Here, a travel direction of the image bearer on which a correction pattern is drawn is referred to as a sub-scanning direction. In addition, a direction perpendicular to the sub-scanning direction is referred to as a main-scanning direction.

A positional deviation correction pattern 100 includes a first pattern image 110 formed downstream of the sub-scanning direction and is previously detected by the density sensor 12, and a second pattern image 120 detected after the first pattern image 110. The first and second pattern images 110 and 120 include first and second pattern image portions 111 and 121 which are used for the positional deviation correction, respectively. Further, the positional deviation correction pattern 100 illustrated in the drawing is an example in which the pattern image and the pattern image portion are the same as each other.

The positional deviation correction pattern 100 can be constituted by two right-angled isosceles triangles which are disposed to be separated from or adjacent to each other in the sub-scanning direction and have the same shape. Each of the right-angled isosceles triangles includes two sides which respectively extend in the sub-scanning direction and the main-scanning direction, and an oblique side inclined to both the sub-scanning direction and the main-scanning direction, and extends in parallel with an oblique side of the other right-angled isosceles triangle. The two right-angled isosceles triangles are disposed in point symmetry in such a manner that the oblique sides face each other, and the positions thereof in the main-scanning direction positions are the same as each other.

In this embodiment, the image bearer on which the positional deviation correction pattern is formed is the photoconductor 1, but the positional deviation correction pattern can be formed on the transfer device 9 instead of the photoconductor 1.

In this embodiment, the reason why the image bearer on which the pattern image is formed is the photoconductor 1 is that a state of a sensor waveform Vt (voltage signal) output from the density sensor 12 is more satisfactory in comparison to the transfer device 9. That is, typically, the surface of the photoconductor 1 is a mirror surface, and thus a difference (difference in a voltage signal) in reflectance between the positional deviation correction pattern and a background portion (non-image portion) is large, and a satisfactory sensor waveform Vt is obtained.

A sensor waveform Vt illustrated in FIG. 4 is a voltage signal when the surface of the photoconductor 1 is detected by the density sensor 12. "a" represents a distance of the first pattern image portion 111, which is detected by the density sensor 12, in the sub-scanning direction; "b" represents a distance of the second pattern image portion 121, which is detected by the density sensor 12, in the sub-scanning direction; and "c" represents a distance of the background portion (non-image portion), which is located between the first pattern image portion 111 and the second pattern image portion 121, in the sub-scanning direction.

An ideal drawing position of the positional deviation correction pattern illustrated in FIG. 4 in the main-scanning direction is a position (position at which the distance "a" equals to the distance "b") at which the density sensor 12 with a fixed position detects the central position of the pattern image portion in the main-scanning direction. In a case where the positional deviation correction pattern deviates from the ideal drawing position, a positional deviation correction value for correction of a deviation from the ideal drawing position is calculated based on the sensor waveform output from the density sensor 12.

In the example illustrated in FIG. 4, when desiring to draw the positional deviation correction pattern at the ideal position, the positional deviation correction value may be determined with respect to the sensor waveform Vt so that the distance "a" equals to the distance "b". The positional deviation correction value is represented by a distance "d" (or the number of lines "d") between a position of the pattern image portion detected by the density sensor 12 in the main-scanning direction, and the central position of the pattern image portion in the main-scanning direction.

Calculation for conversion of the sensor waveform Vt into the distances "a" to "c" is performed by the printing position calculation unit 40. The printing position calculation unit 40 calculates each of the distances "a" and "b" by multiplying time, during which each of the first pattern image portion 111 and the second pattern image portion 121 is detected, of the sensor waveform Vt, by a writing frequency generated by the writing clock generation circuit 37. That is, each of the distances "a" and "b" is the number of lines in the sub-scanning direction.

Here, the first pattern image portion 111 and the second pattern image portion 121, which are illustrated in FIG. 4, are right-angled isosceles triangles having two sides along the sub-scanning direction and the main-scanning direction, respectively, and an oblique side inclined by 45° with respect to the two sides. Accordingly, the amount of displacement of the first pattern image portion 111 and the second pattern image portion 121 in the main-scanning direction is observed as the amount of displacement of the distance "a" and "b" in the sub-scanning direction.

In a case where the right-angled isosceles triangles illustrated in FIG. 4 is used as a pattern image, the main-scanning direction positional deviation correction value is obtained by the following formula.

Main-scanning direction positional deviation correction value: $d=(a-b)/2$ (1)

Analog Sensor Waveform-Black Color Pattern

Figure 5:
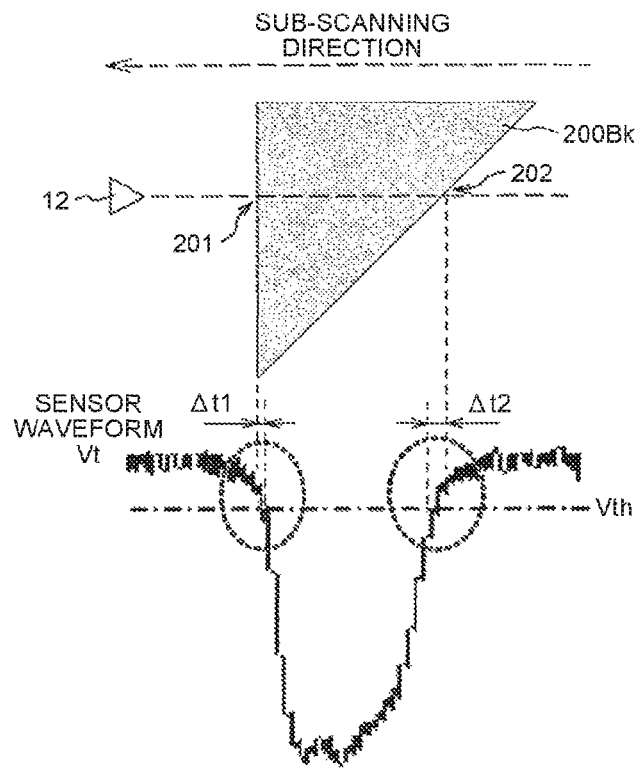
FIG. 5 is a view illustrating an example of an actual voltage waveform when a density sensor detects a black color pattern.

FIG. 5 is a view illustrating an example of an actual voltage waveform when the density sensor 12 detects the black color pattern.

A voltage value actually output from the density sensor 12 is analog data, and the voltage waveform is not a digital type as illustrated in FIG. 4. In addition, a waveform is different between a portion (leading edge portion 201) at which the surface of the photoconductor transitions from a background portion (non-image portion) to a black pattern portion 200Bk, and a portion (trailing edge portion 202) at which the surface of the photoconductor transitions from the black pattern portion 200Bk to the background portion. This is because density detection accuracy of a portion at which a color varies is not linear due to characteristics of the density sensor 12, and thus an output waveform of the leading edge portion 201 and an output waveform of the trailing edge portion 202 become different from each other.

Here, when Vth in the output waveform Vt of the density sensor 12 is set as a threshold voltage (threshold), errors ($\Delta t1$, $\Delta t2$) occur between a detection position of the edge portion which is obtained by the density sensor 12, and an actual image edge portion. In addition, this error is different between the error $\Delta t1$ of the leading edge portion and the error $\Delta t2$ of the trailing edge portion. Accordingly, in the method of the related art in which a distance between correction patterns is detected based on a detection initiation position (or detection termination position) of a correction pattern, there is a problem in that correction pattern detection accuracy decreases due to an influence of the error.

There are various causes for the variation in the error $\Delta t1$ and the error $\Delta t2$, and examples of the causes with a particularly great influence on the variation include (1) a variation in sensor output characteristics in accordance with temperature conditions during correction pattern detection; (2) a variation in density of the correction pattern itself; and (3) contamination of a light-receiving unit of the sensor with the passage of time.

Analog Sensor Waveform—Chromatic Color Pattern

Figure 6:
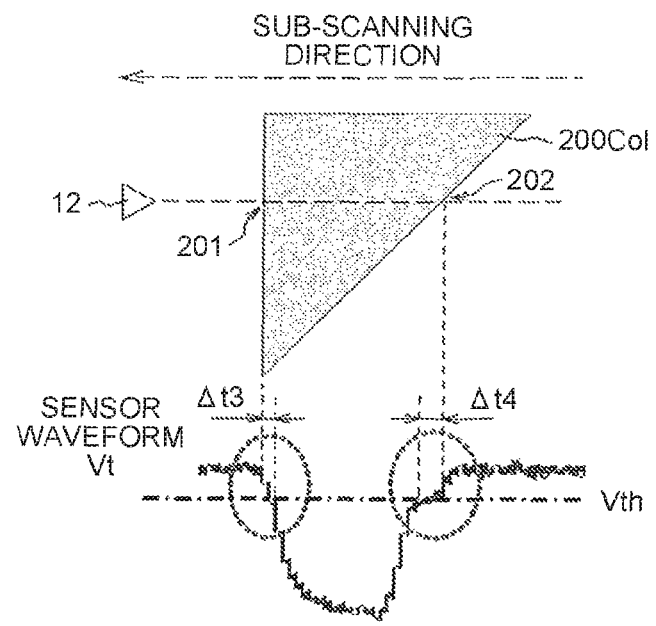
FIG. 6 is a view illustrating an example of an actual voltage waveform when the density sensor detects a chromatic color pattern.

FIG. 6 is a view illustrating an example of an actual voltage waveform when the density sensor 12 detects the chromatic color pattern. In the drawing, a reference numeral 200Col represents a chromatic color pattern portion.

In a case where the correction pattern has a chromatic color, a difference (amount of voltage falling) in a voltage Vt of the density sensor 12 from that of the background portion is smaller in comparison to a case where a black color pattern is detected. Accordingly, when the voltage Vth is set to a threshold voltage as is the case with FIG. 5, errors ($\Delta t3$, $\Delta t4$), which occur between a detection position of the edge portion obtained by the density sensor 12 and an actual image edge portion, further increase in comparison to the errors ($\Delta t1$, $\Delta t2$) in a case of the black color.

Therefore, in the method of the related art in which a distance between correction patterns is detected based on a detection initiation position (or detection termination position) of a correction pattern, there is a problem in that correction pattern detection accuracy decreases due to an influence of the error. For example, in a case where a distance between leading end side detection positions of the black color correction pattern and the chromatic color correction pattern is set as a distance between the black color correction pattern and the chromatic color correction pattern, since the error $\Delta t1$ and the error $\Delta t3$ are different from each other, and thus in the related art, it is difficult to accurately detect the distance between both patterns. Similarly, in a case where a distance between trailing end side detection positions of the black color correction pattern and the chromatic color correction pattern is set as a distance between the black color correction pattern and the chromatic color correction pattern, since the error $\Delta t2$ and the error $\Delta t4$ are different from each other, and thus in the related art, it is difficult to accurately detect the distance between both patterns.

Main-Scanning Direction Positional Deviation Correction Formula—Black Pattern

Figure 7:
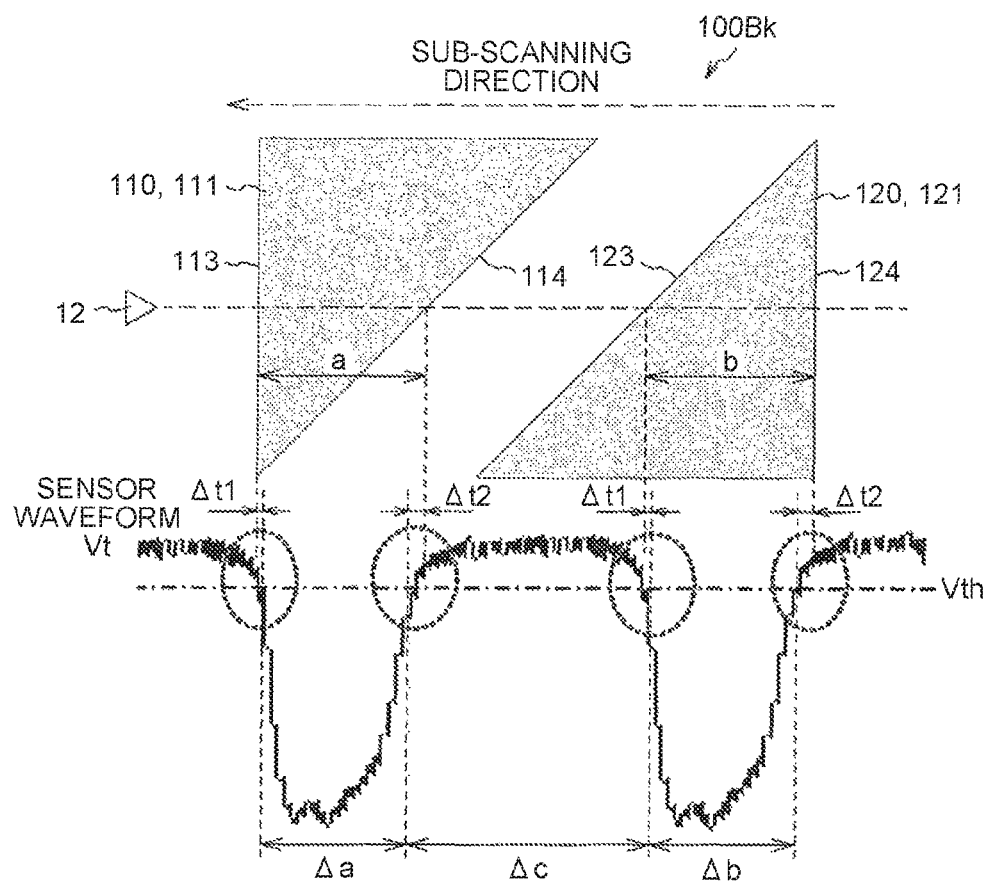
FIG. 7 is a view illustrating a voltage waveform when the density sensor detects a black color positional deviation correction pattern according to one embodiment of the invention.

FIG. 7 is a view illustrating a voltage waveform when the density sensor 12 detects a black color positional deviation correction pattern according to the embodiment of the invention. The positional deviation correction pattern illustrated in FIG. 7 is the same as the positional deviation correction pattern illustrated in FIG. 4.

In a black color positional deviation correction pattern 100Bk, lengths of an actual image of the first and second pattern image portions 111 and 121 in the sub-scanning direction at a detection position of the density sensor 12 are set as a and b, respectively. A positional deviation correction value d in the main-scanning direction is obtained by the following formula as described above.

$$d=(a-b)/2 \quad (1)$$

Here, the lengths of the first and second pattern image portions 111 and 121 in the sub-scanning direction detected by the density sensor 12 has an error $\Delta t1$ and an error $\Delta t2$, and thus formula (1) is modified in consideration of the errors. A positional deviation correction value d' in the main-scanning direction is obtained by the following formula (2).

$$d'=\{(\Delta a+\Delta t1+\Delta t2)-(\Delta b+\Delta t1+\Delta t2)\}/2=(\Delta a-\Delta b)/2 \quad (2)$$

In FIG. 7, two pattern image portions are arranged in parallel in the sub-scanning direction, and thus in formula (2), the error $\Delta t1$ of a leading edge portion 113 (123) and the error $\Delta t2$ of a trailing edge portion 114 (124) are cancelled. According to this, it is possible to accurately calculate the positional deviation correction value d by using actually measured values $\Delta a$ and $\Delta b$ which are obtained by the density sensor 12.

Figure 8:
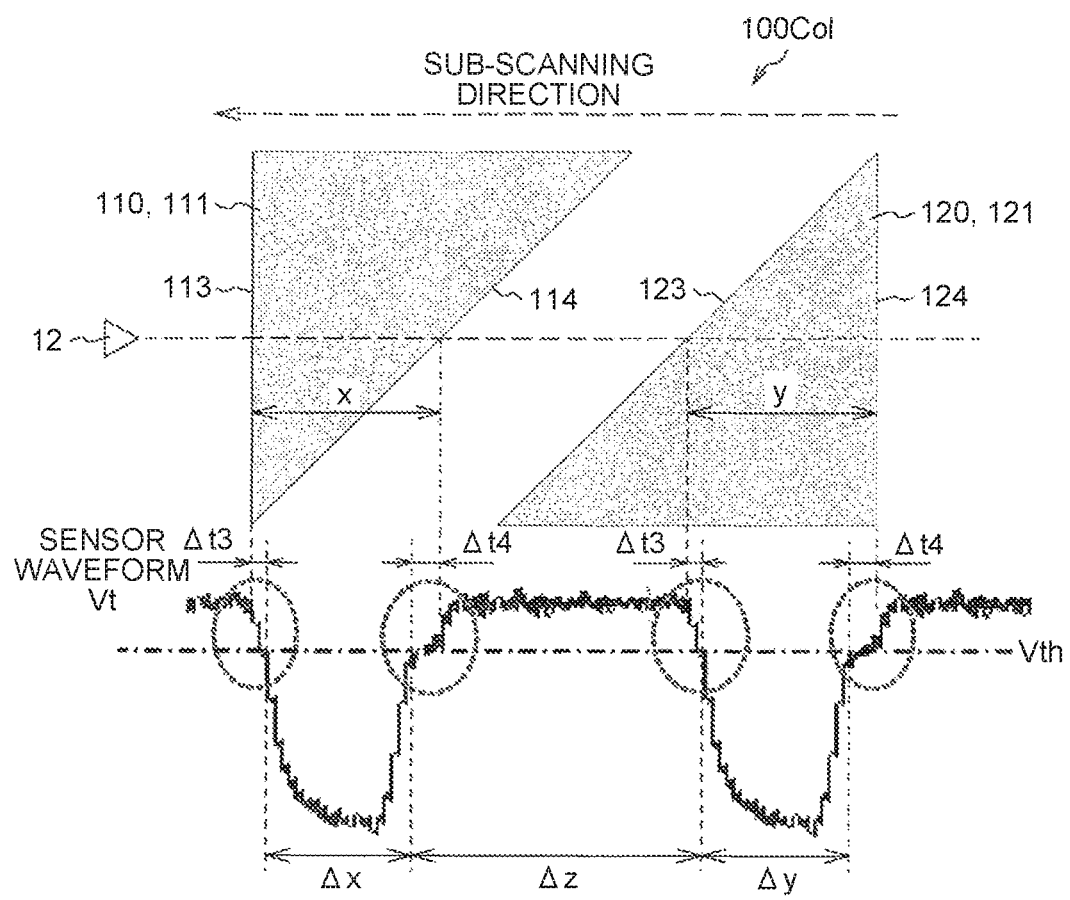
FIG. 8 is a view illustrating a voltage waveform when the density sensor detects a positional deviation correction pattern of a chromatic color according to one embodiment of the invention.

Main-Scanning Direction Positional Deviation Correction Formula—Chromatic Color Pattern FIG. 8 is a view illustrating a voltage waveform when the density sensor 12 detects a positional deviation correction pattern of a chromatic color according to the embodiment of the invention. The positional deviation correction pattern illustrated in FIG. 8 is the same as the positional deviation correction pattern illustrated in FIG. 4.

In a chromatic color positional deviation correction pattern 100Col, lengths of an actual image of the first and second pattern image portions 111 and 121 in the sub-scanning direction at a detection position of the density sensor 12 are set as x and y, respectively. As is the case with the black color, in the case of the chromatic color, a positional deviation correction value d" in the main-scanning direction is obtained by modifying formula (1).

$$d''=\{(\Delta x+\Delta t3+\Delta t4)-(\Delta y+\Delta t3+\Delta t4)\}/2=(\Delta x-\Delta y)/2 \quad (3)$$

Even in the chromatic color positional deviation correction pattern, an error $\Delta t3$ of a leading edge portion 113 (123) and an error $\Delta t4$ of a trailing edge portion 114 (124) are cancelled. According to this, it is possible to accurately calculate the correction value by using actually measured values $\Delta x$ and $\Delta y$ which are obtained by the density sensor 12.

As described above, in either case of the black color or the chromatic color, a difference in a width between two correction patterns is calculated from actually measured values of the length in the sub-scanning direction detected by using the threshold voltage Vth, thereby obtaining the positional deviation correction value in the main-scanning direction. In the positional deviation correction value, the errors $\Delta t1$ to $\Delta t4$ of the edge portion are canceled, and thus it is possible to calculate a correction value without an error influence.

Reference Value for Correction of Color Shift in Sub-Scanning Direction of Black Color and Chromatic Color In FIG. 7, if values obtained by correcting main-scanning positions of $\Delta a$ and $\Delta b$ are indicated by $\Delta A$ and $\Delta B$, the following formula is held:

$$\Delta A=\Delta B=(\Delta a+\Delta b)/2$$

$\Delta A$, $\Delta B$, or $(\Delta a+\Delta b)/2$ is necessary as a reference value for correction of the color shift in the sub-scanning direction.

When the positional deviation correction pattern of the black color of FIG. 7 is drawn on a subject, the printing position calculation unit 40 calculates $(\Delta a+\Delta b)/2$, and stores the calculated value in the position information memory 41. $(\Delta a+\Delta b)/2$ can be calculated using the correction pattern when the main-scanning position correction is performed. Thus, it is unnecessary to draw the correction pattern again after the main-scanning position correction ends, and it is possible to reduce a period of time taken for correction of the color shift in the sub-scanning direction.

Flowchart of Operation of Correcting Positional Deviation—Two Colors

Figure 9:
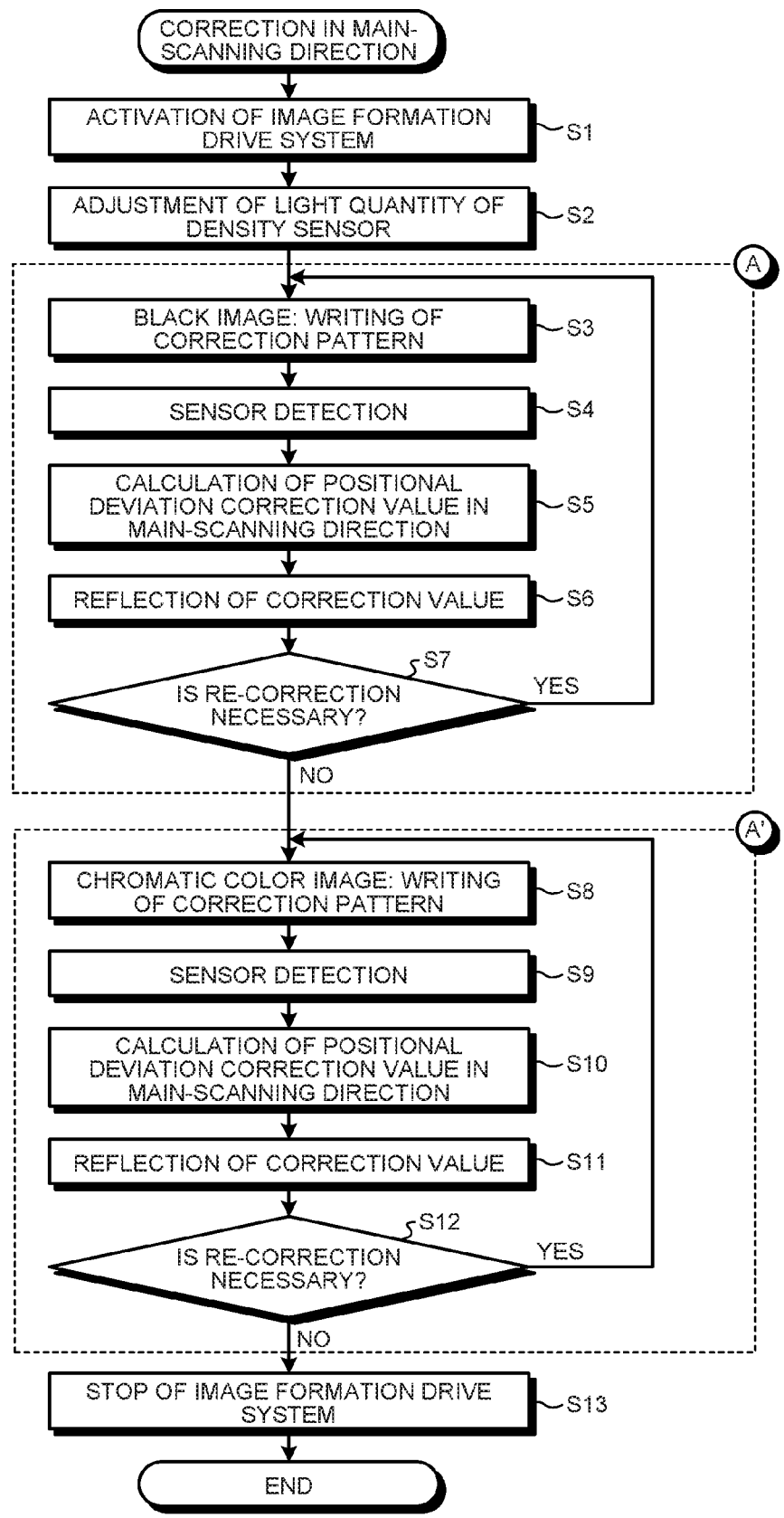
FIG. 9 is a flowchart illustrating an operation of correcting a positional deviation in a main-scanning direction in a case where an image formed has two colors.

FIG. 9 is a flowchart illustrating an operation of correcting a positional deviation in the main-scanning direction in a case where an image formed has two colors.

Step S1: Activation of an Image Formation Drive System

The image forming apparatus activates an image formation drive system, and performs preparation of forming an electrostatic latent image on the photoconductor 1. Specifically, the polygon mirror drive circuit 22 drives the polygon motor to rotate the polygon mirror 23, and stabilizes the number of revolutions per unit time. The photoconductor drive circuit 29 drives a photoconductor motor to rotate the photoconductor 1. The engine CPU 16 operates the transfer device 9.

Step S2: Adjustment of the Light Quantity of the Density Sensor

The PWM light quantity control unit 38 performs adjustment of the light quantity of the density sensor 12. The density sensor 12 is a reflective sensor including a light-emitting element and a light-receiving element, and thus the PWM light quantity control unit 38 performs adjustment in such a manner that a PWM value of the light-emitting element becomes a target sensor output voltage. Further, details of this step will be described later.

Steps S3 to S7: Correction of Positional Deviation of a Black Color Image in the Main-Scanning Direction Steps S3 to S7 are steps relating to position correction of the black color image in the main-scanning direction. Hereinafter, description will be given of respective steps.

Step S3: Writing of a Correction Pattern for a Black Color

The laser drive circuit 18 drives the laser 19 for black to form an electrostatic latent image of a positional deviation correction pattern for a black color on the surface of the photoconductor 1. Further, the positional deviation correction pattern for a black color is generated by the positional deviation correction pattern generation unit 42 of the writing control unit 14. For example, the positional deviation correction pattern for a black color can be formed as two right-angled isosceles triangles illustrated in FIG. 7. The electrostatic latent image of the positional deviation correction pattern for a black color is developed with a black toner in the first developing device 4.

Step S4: Detection of a Correction Pattern

The density sensor 12 reads out the black color positional deviation correction pattern formed on the photoconductor 1. A voltage signal output from the density sensor 12 is amplified by the amplification circuit 39.

Step S5: Calculation of a Positional Deviation Correction Value in the Main-Scanning Direction The printing position calculation unit 40 calculates a positional deviation correction value in the main-scanning direction based on the voltage signal received from the density sensor 12 through the amplification circuit 39. Specifically, a positional deviation correction value d' is obtained in accordance with formula (2). The printing position calculation unit 40 stores necessary information in the position information memory 41. The position information memory 41 stores the actually measured values Δa and Δb which are obtained by the density sensor 12, and the positional deviation correction value d'.

Step S6: Reflection of the Correction Value

The positional deviation correction value d' is transmitted from the position information memory 41 to the engine CPU 16. The engine CPU 16 generates printing timing information of the black color image data in the main-scanning direction from the positional deviation correction value d'. The engine CPU 16 transmits the printing timing information to the buffer memory control unit 43. During outputting of the subsequent black image, the buffer memory control unit 43 performs read and write control of the image data stored in the buffer memory based on the printing timing information.

Step S7: Determination on Whether Re-Correction is Necessary

The engine CPU 16 determines whether re-correction is necessary based on the positional deviation correction value d' calculated in step S5. That is, in a case where d' is 0 (NO in step S7), the engine CPU 16 determines that the re-correction is not necessary. In this case, processes subsequent to step S8 are performed. In a case where d' is not 0 (YES in step S7), the engine CPU 16 determines that re-correction is necessary. In this case, the position correction process of a black color image in the main-scanning direction in steps S3 to S7 is performed again.

Steps S8 to S12: Correction of the Positional Deviation of the Chromatic Color Image in the Main-Scanning Direction Steps S8 to S12 are steps relating to the position correction of the chromatic color image in the main-scanning direction. In the respective steps, the same processes as in steps S3 to S7 in the position correction of the black color image in the main-scanning direction are performed except that a color of a formed image is different, and thus description thereof will not be repeated.

Step S13: Stop of the Image Formation Drive System

This process is a process of stopping the image formation drive system activated in step S1. That is, the polygon mirror drive circuit 22 stops the polygon motor, and the photoconductor drive circuit 29 stops the photoconductor motor, thereby stopping rotation of the polygon mirror 23 and the photoconductor 1. In addition, the engine CPU 16 stops the transfer device 9.

Adjustment of Light Quantity of Density Sensor

Figure 10:
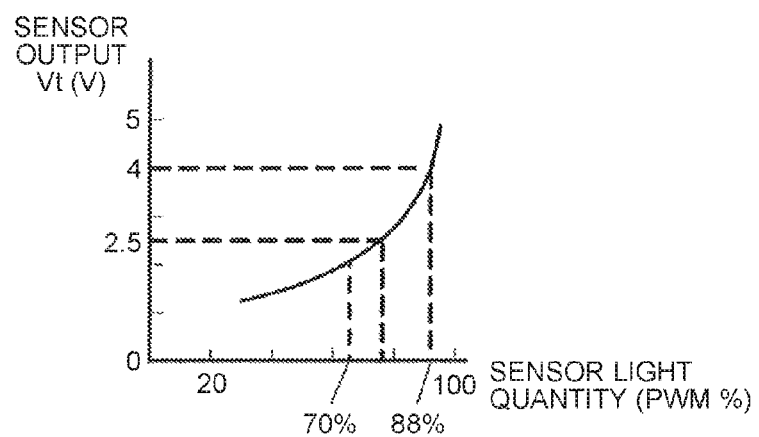
FIG. 10 is a view illustrating a relationship between a light quantity (PWM value) of a light-emitting element, and an output (voltage V) of a light-receiving element.
Figure 11:
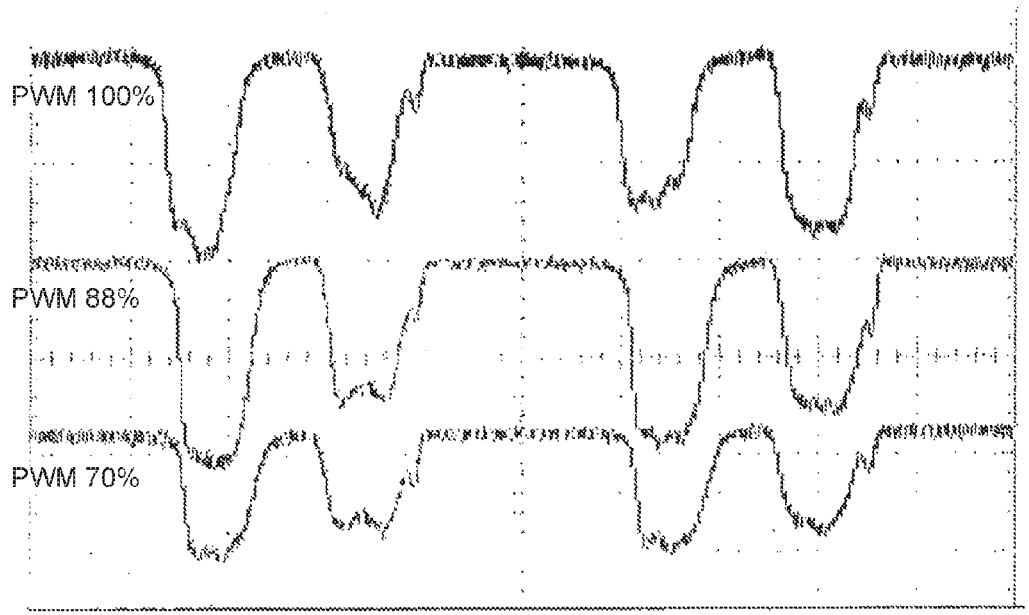
FIG. 11 is a view illustrating a sensor output waveform when the light quantity (PWM value) of a light-emitting element is changed.

Description will be given of adjustment of the light quantity of the density sensor 12 which is performed by the PWM light quantity control unit 38 in step S2. FIG. 10 is a view illustrating a relationship between the light quantity (PWM value) of the light-emitting element and an output (voltage V) of the light-receiving element. FIG. 10 is a graph in a case where the surface (background portion) of the photoconductor is set as a detection target. FIG. 11 is a view illustrating a sensor output waveform when the light quantity (PWM value) of the light-emitting element is changed.

In output characteristics when the density sensor 12 detects a background portion of the photoconductor 1, as illustrated in FIG. 10, a region (upper-right portion) highly sensitive to the PWM value, a linear region (intermediate region), and a region (lower-left portion) less sensitive to the PWM value are present. In a case where the density sensor 12 is used in the linear region in which output sensitivity to the PWM value is linear, waveform quality of a density sensor output signal is stable, and thus this case is preferable.

In a case of FIG. 10, the output of the density sensor 12 is stable in a region of 4 V to 2.5 V. Here, during actual use, when the density sensor 12 detects the background portion of the photoconductor 1, an output voltage of the density sensor 12 is the maximum, and when detecting a pattern image portion, the output voltage becomes lower than the maximum value. Accordingly, in the linear region in FIG. 10, it is optimal that a sensor light quantity with which the output voltage of the density sensor 12 becomes the maximum value of 4 V is set as the PWM value. In FIG. 10, the PWM value when the output voltage becomes 4 V is 88%.

FIG. 11 illustrates output waveforms of the density sensor 12 when the PWM value is set to 100%, 88%, and 70%, respectively. The PWM values of 100% and 70% are selected in a region out of the linear region in FIG. 10. As illustrated in FIG. 11, when the PWM value is 88% of the optimal value, waveform quality of the output voltage signal of the density sensor 12 becomes more stable in comparison to the PWM values of 100% and 70%. When the waveform quality of the output voltage of the density sensor 12 is stable, the errors Δt1 to Δt4 illustrated in FIGS. 5 and 6 are stable. That is, a variation in the error is suppressed, and thus it is possible to improve quality in the positional deviation correction.

Light Quantity Adjustment Flow in Density Sensor

Figure 12:
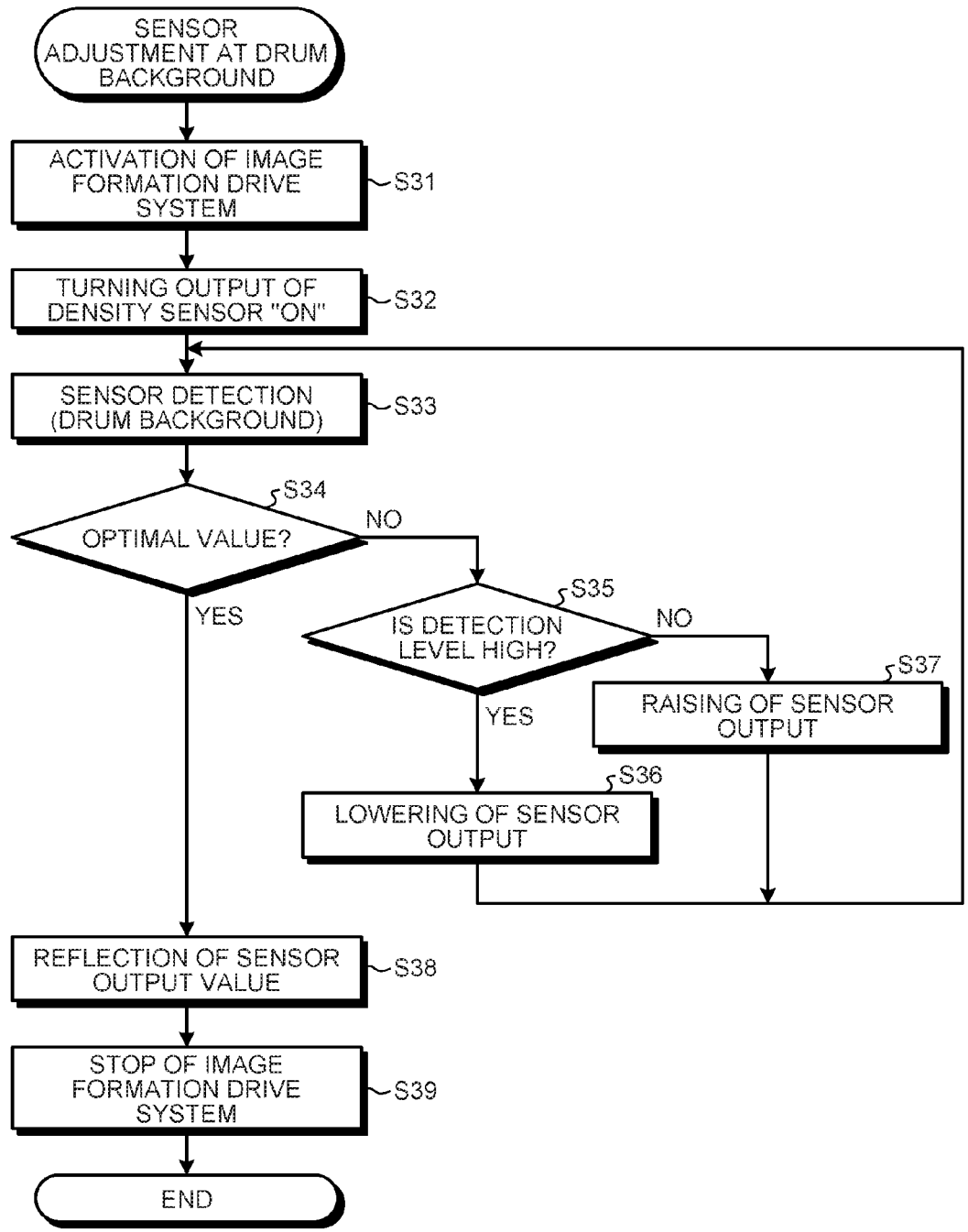
FIG. 12 is a flowchart illustrating a light quantity adjustment procedure in the density sensor.

FIG. 12 is a flowchart illustrating a light quantity adjustment procedure in the density sensor 12. This flowchart illustrates a procedure of adjusting an optimal value of the PWM value of the density sensor 12.

Step S31: Activation of the Image Formation Drive System

The image forming apparatus activates an image formation drive system, and performs preparation of forming an electrostatic latent image on the photoconductor 1. This process is the same as in step S1 in FIG. 9.

Step S32: Turning Output of the Density Sensor "ON"

A PWM signal is transmitted from the PWM light quantity control unit 38 to the light-emitting element of the density sensor 12 to allow the light-emitting element to emit light. As a PWM value at this time, a value, which is stored in the memory 17 illustrated in FIG. 2 as a control variable state value, is used.

Step S33: Detection of the Background Portion of the Photoconductor 1 by the Density Sensor 12

In this step, the electrostatic latent image is not drawn on the surface of the photoconductor 1, and thus the surface of the photoconductor 1 is in a state in which a toner is not attached thereto. The density sensor 12 detects the background portion (non-image portion) of the photoconductor 1. An output voltage of the density sensor 12 is transmitted to the engine CPU 16 through the amplification circuit 39 and the A/D conversion unit 44.

Step S34: Determination on Whether the Output Voltage of the Density Sensor 12 is an Optimal Value The engine CPU 16 determines whether the output voltage of the density sensor 12, which is digitized by the A/D conversion unit 44, is an optimal voltage value (4 V in FIG. 10). In a case where the output voltage is the optimal value (YES in step S34), it is not necessary to perform adjustment, and thus a process in step S38 is performed. In a case where the output voltage is not the optimal value (NO in step S34), re-adjustment is necessary, and thus a process in Step S35 is performed.

Step S35: Determination on Output Voltage Level of the Density Sensor 12

Whether the output voltage of the density sensor 12 is higher or lower than the optimal value (4 V in FIG. 10) is determined. In a case where the output value is higher than the optimal value (YES in step S35), a process in step S36 is performed. In a case where the output value is lower than the optimal value (NO in step S35), a process in step S37 is performed.

Step S36: Lowering of the Output Value of the Density Sensor 12

The PWM light quantity control unit 38 outputs a PWM signal, in which a duty ratio of a pulse width is decreased, to the light-emitting element of the density sensor 12. After this process, the processes subsequent to step S33 are performed.

Step S37: Raising of the Output Value of the Density Sensor

The PWM light quantity control unit 38 outputs a PWM signal, in which the duty ratio of the pulse width is raised, to the light-emitting element of the density sensor 12. After this process, the processes subsequent to step S33 are performed.

Step S38: Reflection of the Output Value of the Density Sensor

In a case where the output voltage of the density sensor 12 is the optimal value (4 V in FIG. 10), a duty ratio of the PWM signal is stored in the memory 17 illustrated in FIG. 2. During the subsequent detection, the PWM light quantity control unit 38 transmits a PWM signal of the duty ratio to the light-emitting element for light-emission.

Step S39: Stop of the Image Formation Drive System

This process is a process of stopping the image formation drive system activated in step S31. This process is the same as in step S13 in FIG. 9.

Through the above-described processes, the light quantity of the density sensor 12 is optimized. Further, in a case where this process is performed as step S2 in the flow of FIG. 9, the processes in steps S31 and S39 are omitted.

Flowchart of Positional Deviation Correction Operation—Full Color

FIG. 13 is a flowchart illustrating an operation of correcting the positional deviation in the main-scanning direction in a case where an image formed has four colors. The image forming apparatus of this case is an apparatus that includes image forming units of respective colors, and forms a full-color image by overlapping images of respective colors. Hereinafter, description will be given of only portions different from those in FIG. 9.

First, processes in steps S1 and S2 are performed.

In step SR1, a sub-routine "correction of a positional deviation of a black color image in the main-scanning direction" is performed. This process corresponds to the processes in steps S3 to S7 in FIG. 9 (portions surrounded by a frame A in FIG. 9).

In steps SR2 to SR4, a sub-routine "correction of a positional deviation of a chromatic color image in the main-scanning direction" is performed. This process corresponds to the processes in steps S8 to S12 in FIG. 9 (portion surrounded by a frame A' in FIG. 9). In the respective sub-routines, a color that is a target of the positional deviation correction is different in each case. The correction of the positional deviation of a yellow (Y) image in the main-scanning direction is performed in step SR2; the correction of the positional deviation of a magenta (M) image in the main-scanning direction is performed in step SR3; and correction of the positional deviation of a cyan (C) image in the main-scanning direction is performed in step SR4.

In this way, the correction of the positional deviation according to this embodiment can be performed regardless of the number of colors.

Example of Positional Deviation Correction Pattern

Figure 14A:
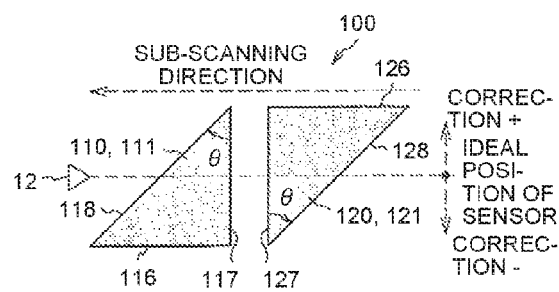
FIG. 14A is a view illustrating an example of a positional deviation correction pattern formed on an image bearer.

FIGS. 14A to 16B are views each illustrating an example of the positional deviation correction pattern formed on the image bearer. FIGS. 14A to 14C each illustrate an example of a triangular pattern, and FIGS. 15A to 15C each illustrate an example of a quadrilateral pattern. In addition, FIGS. 16A and 16B each illustrate an example of a correction pattern having a portion not used for the positional deviation correction.

As illustrated in FIGS. 14A to 16B, a positional deviation correction pattern 100 is constituted by a pair of pattern images including a first pattern image 110 formed on a downstream side in the sub-scanning direction, and a second pattern image 120 formed upstream of the first pattern image 110. The first pattern image 110 and the second pattern image 120 are disposed to be separated from each other and to be adjacent to each other in the sub-scanning direction.

The pattern image 110 includes a first pattern image portion 111, and the pattern image 120 include a second pattern image portion 121. The first pattern image portion 111 and the second pattern image portion 121 are disposed at the same position in the main-scanning direction and have the same width in the main-scanning direction. In other words, in the first pattern image 110 and the second pattern image 120, regions, which are common in a position in the main-scanning direction, are the first pattern image portion 111 and the second pattern image portion 121. The first pattern image portion 111 and the second pattern image portion 121 are used for positional deviation correction. The first pattern image 110 and the first pattern image portion 111 may be the same. The second pattern image 120 and the second pattern image portion 121 may be the same.

FIGS. 14A to 14C and FIGS. 15A to 15C each illustrate an example in which the first and second pattern images 110 and 120 and the first and second pattern image portions 111 and 121 are the same. FIGS. 16A and 16B each illustrate an example in which the first pattern image 110 is constituted by the first image portion 111 and first out-of-region pattern image portion 115, and the second pattern image 120 is constituted by the second image portion 121 and second out-of-region pattern image portion 125. The first image portion 111 and the second image portion 121 are portions used for the positional deviation correction, whereas the first out-of-region pattern image portion 115 and the second out-of-region pattern image portion 125 are portions not used for the positional deviation correction. The shape of the first and second out-of-region pattern image portions 115 and 125 is not particularly limited.

In the pattern images used in this embodiment, it is demanded to avoid an influence due to a detection error of an edge portion by the density sensor 12, and to detect a positional deviation in the main-scanning direction by a simple method. Accordingly, two pattern image portions, which are adjacent to each other in the sub-scanning direction, are set to have a shape with which the positional deviation in the main-scanning direction can be calculated from a difference in a length in the sub-scanning direction detected by the density sensor 12.

The above-described conditions which are demanded for the pattern image portions are as follows.

(0) The two pattern image portions 111 and 121 are solid-filled at a density detectable by the density sensor 12.

(1) The two pattern image portions 111 and 121 are disposed at the same position in the main-scanning direction and have the same width in the main-scanning direction.

(2) Each of the two pattern image portions 111 and 121 includes at least one side (first side 116 or 126) that extends in parallel with the sub-scanning direction. From the condition (1), each of the first sides 116 and 126 constitutes a short edge of each of the pattern image portions 111 and 121 in the main-scanning direction.

(3) Each of the two pattern image portions 111 and 121 includes a second side (second side 117 or 127) that continues from one end of each of the first sides 116 and 126 and extends in a direction that intersects the sub-scanning direction. The second sides 117 and 127 may be parallel to the main-scanning direction.

(4) Each of the two pattern image portions 111 and 121 includes a third side (third side 118 or 128) that continues from the other end of each of the first sides 116 and 126, and extends in a direction that intersects both the sub-scanning direction and each of the second sides 117 and 127. From the condition (3), the third sides 118 and 128 are oblique sides which inclined with respect to the main-scanning direction. From this condition, the two pattern image portions 111 and 121 do not include a parallelogram (and rectangle).

Figure 14B:
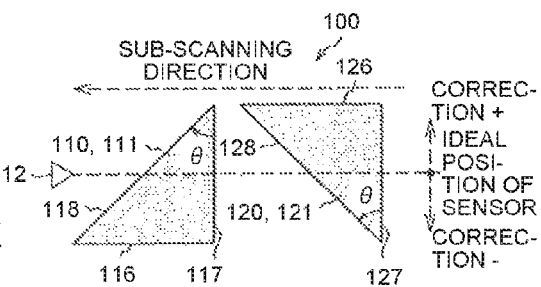
FIG. 14B is a view illustrating an example of the positional deviation correction pattern formed on the image bearer.

(5) In the two pattern image portions 111 and 121, an inclination angle with respect to a virtual line parallel to the main-scanning direction is the same between the second sides 117 and 127, and between the third sides 118 and 128. Herein, the inclination angle represents an absolute value of an angle, and for example, as illustrated in FIG. 14B or 15C, even when sides are not parallel to each other, this condition is satisfied. Further, with regard to the second sides 117 and 127, an inclination angle with respect to the main-scanning direction may be 0°.

(6) The lengths of the two pattern image portions 111 and 121 in the sub-scanning direction increase or decrease in an opposite direction in the main-scanning direction. That is, when the length of one pattern image portion in the sub-scanning direction gradually increases from one end to the other end in the main-scanning direction, the length of the other pattern image portion in the sub-scanning direction gradually decreases. In a case of FIG. 14A, the length of the first pattern image portion 111 in the sub-scanning direction gradually increases from an upper side to a lower side in the main-scanning direction. In contrast, the sub-scanning direction of the second pattern image portion 121 gradually decreases.

From this condition and the condition (2), the first side 116 of the first pattern image portion 111 is located at an edge on one side in the main-scanning direction, and the first side 126 of the second pattern image portion 121 is located at an edge on the other side in the main-scanning direction.

In addition, from the condition (5), when the length of one pattern image portion in the sub-scanning direction gradually increases (or gradually decreases) in a positive direction of the main-scanning direction, the length of the other pattern image portion in the sub-scanning direction gradually decreases (or gradually increases) by the same amount in a negative direction of the main-scanning direction. In a case where the two pattern image portions 111 and 121 are figures with the same shape which overlap each other in a case being rotated or inverted, when the length of one pattern image portion in the sub-scanning direction gradually decreases (or gradually increases), the other pattern image portion gradually increases (or gradually decreases) at the same ratio.

(7) It is preferable that the lengths in the sub-scanning direction at the centers of both the pattern image portions 111 and 121 in the main-scanning direction are the same as each other. That is, when both the pattern image portions 111 and 121 are formed at an ideal drawing position in the main-scanning direction, it is preferable that the density sensor 12 detects both the pattern image portions 111 and 121 as a figure with the same length in the sub-scanning direction. In this case, the two pattern image portions 111 and 121 become figures having the same shape which overlap each other when being rotated or inverted.

As long as the respective conditions are satisfied, it is possible to freely set the location and the inclination of each side of the pattern image portions. That is, each of the pattern image portions 111 and 121 is a region which is surrounded by at least one side that extends along the sub-scanning direction, and two sides which extend along a direction that intersects the sub-scanning direction, and which is a triangle or a quadrangle.

Figure 17:
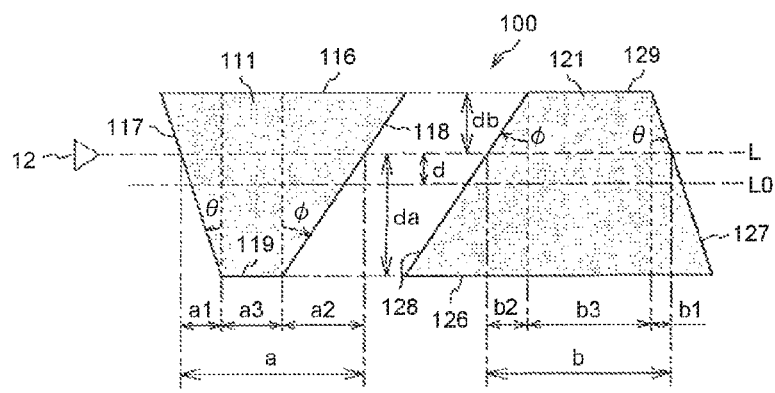
FIG. 17 is a view illustrating an example of the positional deviation correction pattern.

Method of Calculating Positional Deviation Correction Value, and Shape of Positional Deviation Correction Pattern A general formula of the positional deviation d, which is obtained by the positional deviation correction pattern, is obtained. FIG. 17 is a view illustrating an example of the positional deviation correction pattern.

A first side 116, a second side 117, a third side 118, and a fourth side 119 of a first pattern image portion 111 of the positional deviation correction pattern 100 are set as illustrated in FIG. 17. A first side 126, a second side 127, a third side 128, and a fourth side 129 of a second pattern image portion 121 are set as illustrated in FIG. 17.

A positional deviation between a detection line L of the density sensor 12, and an ideal detection line L0 is set to d. A length of the first pattern image portion 111 in the sub-scanning direction and a length of the second pattern image portion 121 in the sub-scanning direction, which are detected by the density sensor 12, are set to a and b, respectively. In each of the pattern image portions 111 and 121, an inclination angle of each of the second sides 117 and 127 with respect to the main-scanning direction is set to $\theta$, and an inclination angle of each of the third sides 118 and 128 with respect to the main-scanning direction is set to $\phi$. A length of the fourth side 119 of the first pattern image portion 111 is set to a3, and a length of the fourth side 129 of the second pattern image portion 121 is set to b3. Lengths in the main-scanning direction from the fourth side of the respective pattern image portions to the detection line L of the density sensor 12 are set to da and db, respectively.

When the lengths a and b in the sub-scanning direction are expressed in a division manner into a1 to a3, and b1 to b3 as illustrated in the drawing, a and b are as follows.

$$a = a1 + a3 + a2 = da \times \tan\theta + a3 + da \times \tan\phi$$

$$b = b1 + b3 + b2 = db \times \tan\theta + b3 + db \times \tan\phi$$

From a first term and a third term in the respective formulae above, the following formulae are obtained.

$$da = (a1 + a2)/(\tan\theta + \tan\phi)$$

$$db = (b1 + b2)/(\tan\theta + \tan\phi)$$

In addition, a relationship between da, db, and d is as follows.

$$da - d = (da + db)/2$$

The positional deviation d satisfies the following formula.

$$d = (da - db)/2$$
$$= \{(a1 + a2)/(\tan\theta + \tan\phi) - (b1 + b2)/(\tan\theta + \tan\phi)\}/2$$

Accordingly, the following formula is established.

$$d=[\{(a-a3)-(b-b3)\}/(\tan\theta+\tan\phi)]/2 \quad (4)$$

In formula (4), $\theta$, $\phi$, a3, and b3 are known values, and thus when the lengths a and b of the respective pattern image portions 111 and 121 in the sub-scanning direction are known, the positional deviation d is obtained. During actual calculation, from formula (2) and formula (3), the lengths a and b in the sub-scanning direction are substituted with actually measured values $\Delta a$ and $\Delta b$.

FIGS. 14A and 14B each illustrate an example in which the pattern image portions are set as right-angled triangles in which the second sides 117 and 127 extend in parallel with the main-scanning direction, and the third sides 118 and 128 are inclined by 45° with respect to the main-scanning direction. This corresponds to a case where a3 is set to 0, b3 is set to 0, $\theta$ is set to 45°, and $\phi$ is set to 0° in formula (4). In this case, the positional deviation correction value becomes "d=(a−b)/2" illustrated in formula (1).

Figure 14C:
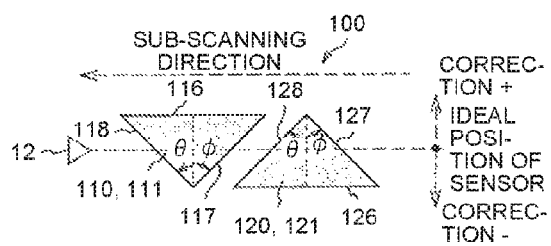
FIG. 14C is a view illustrating an example of the positional deviation correction pattern formed on the image bearer.

FIG. 14C illustrates an example in which the pattern image portions are set as right-angled triangles in which the second side 117 and the third side 118 are set to be perpendicular to each other, and the second side 127 and the third side 128 are set to be perpendicular to each other. This corresponds to a case where a3 is set to 0, b3 is set to 0, $\theta$ is set to 45°, and $\phi$ is set to 45° in formula (4). In this case, the positional deviation correction value becomes "d=(a−b)/4".

Figure 15A:
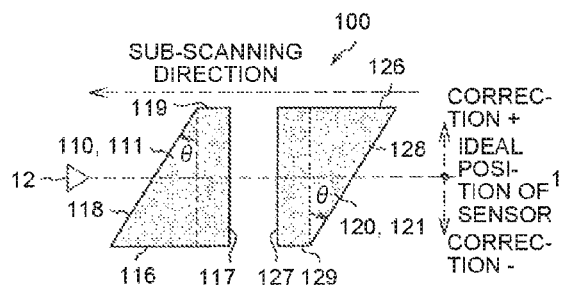
FIG. 15A is a view illustrating an example of the positional deviation correction pattern formed on the image bearer.
Figure 15B:
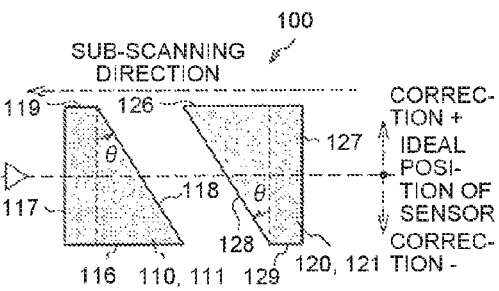
FIG. 15B is a view illustrating an example of the positional deviation correction pattern formed on the image bearer.
Figure 15C:
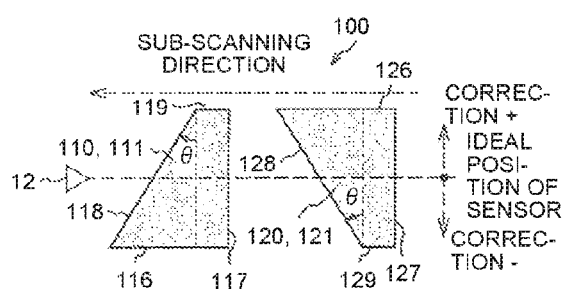
FIG. 15C is a view illustrating an example of the positional deviation correction pattern formed on the image bearer.
Figure 16A:
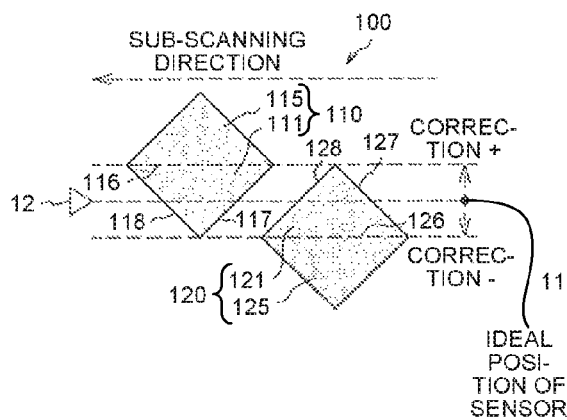
FIG. 16A is a view illustrating an example of the positional deviation correction pattern formed on the image bearer.
Figure 16B:
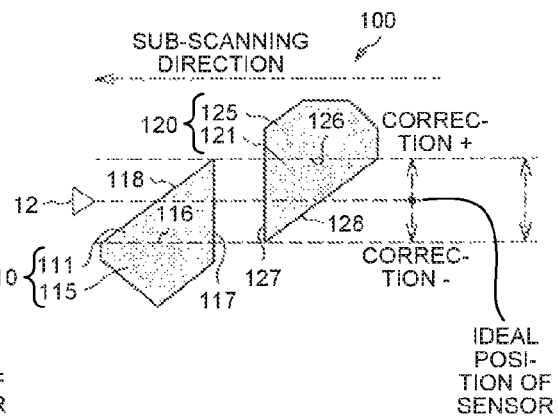
FIG. 16B is a view illustrating an example of the positional deviation correction pattern formed on the image bearer.

FIGS. 15A to 15C each illustrate an example in which the pattern image portions are set as trapezoids. These figures correspond to a case where a3 is set to be equal to b3, and $\phi$ is set to 0° in formula (4). In this case, the positional deviation correction value becomes "d=(a−b)/2 tan $\theta$".

The positional deviation correction pattern 100 illustrated in FIG. 16A includes the first and second pattern image portions 111 and 121, and the first and second out-of-region pattern image portions 115 and 125. The shape of the first and second pattern image portions 111 and 121 is the same as in FIG. 14C.

The positional deviation correction pattern 100 illustrated in FIG. 16B includes the first and second pattern image portions 111 and 121, and the first and second out-of-region pattern image portions 115 and 125. The shapes of the first and second pattern image portions 111 and 121 are the same as in FIG. 14A.

In formula (4), in a case where a3 is equal to b3, the two pattern image portions 111 and 121 become figures which overlap each other when being rotated or inverted. In this case, the positional deviation d is obtained regardless of the length of the first sides 116 and 126, and the fourth sides 119 and 129.

In formula (4), in a case where one of $\theta$ and $\phi$ is 0° and the other is 45°, or in a case where both $\theta$ and $\phi$ are 45°, tan $\theta$ and tan $\phi$ become 0 or 1, formula (4) becomes simple, and thus an error during calculation of the positional deviation d is reduced. The former represents a figure in which the second sides 117 and 127 of the two pattern image portions 111 and 121 are parallel to the main-scanning direction, and the third sides 118 and 128 are inclined with respect to the main-scanning direction by 45°. The latter represents a figure in which the second sides 117 and 127, and the third sides 118 and 128 of the two pattern image portions 111 and 121 are inclined with respect to the main-scanning direction by 45°. Particularly, in a case where a3 is set to be equal to b3, a great effect is obtained.

Modified Example

The example of correcting the positional deviation in the main-scanning direction has been described. A direction in which positional deviation is corrected is not limited to the main-scanning direction, and the positional deviation in the sub-scanning direction may further be corrected. The positional deviation in the sub-scanning direction refers to an image deviation (color shift) among a plurality of colors in the sub-scanning direction. The modified example having such a configuration will be described below.

Figure 18:
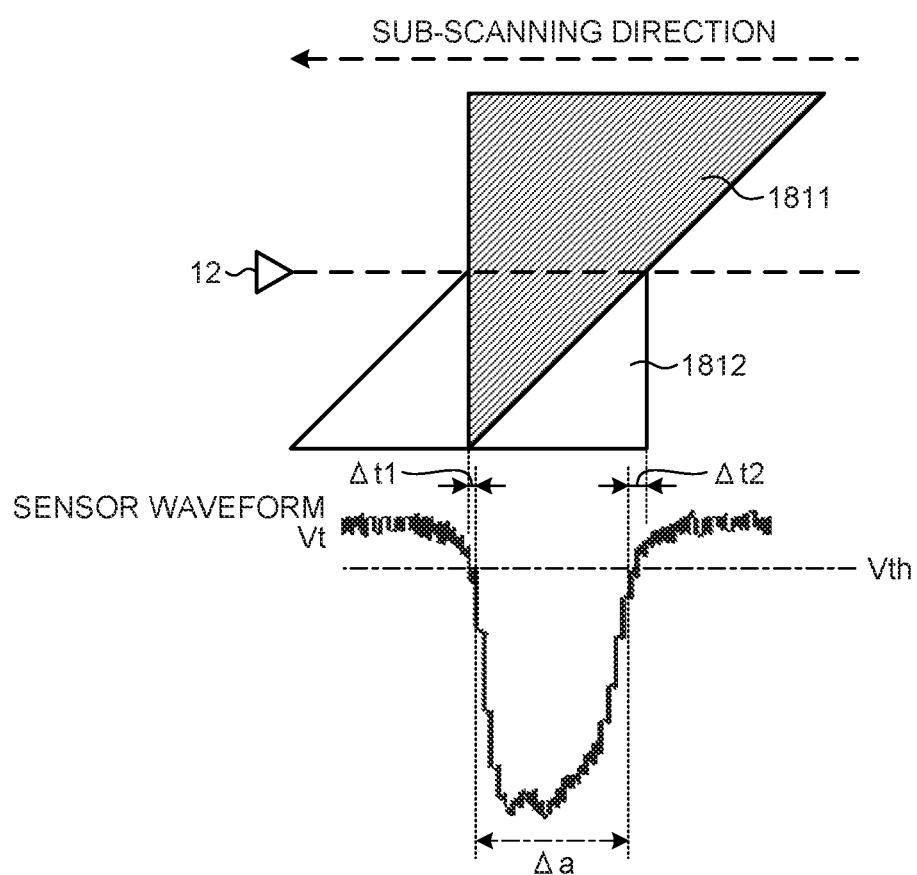
FIG. 18 is a view illustrating an example of a density sensor waveform when there is no color shift in a sub-scanning direction.

FIG. 18 is a view illustrating an example of a density sensor waveform when there is no color shift in the sub-scanning direction. As illustrated in FIG. 18, the correction pattern for correcting the color shift in the sub-scanning direction includes a pattern image 1811 (a third pattern image portion) of a black color and a pattern image 1812 (a fourth pattern image portion) of a chromatic color. A drawing position of the correction pattern is set to a position at which the overlapping length of the pattern image 1811 of the black color and the pattern image 1812 of the chromatic color in the sub-scanning direction are equal to each other at the position of the density sensor 12. If the two colors overlap, the chromatic color is masked by the black color and not detected, and thus the density sensor waveform is the same as that of FIG. 5.

Figure 19:
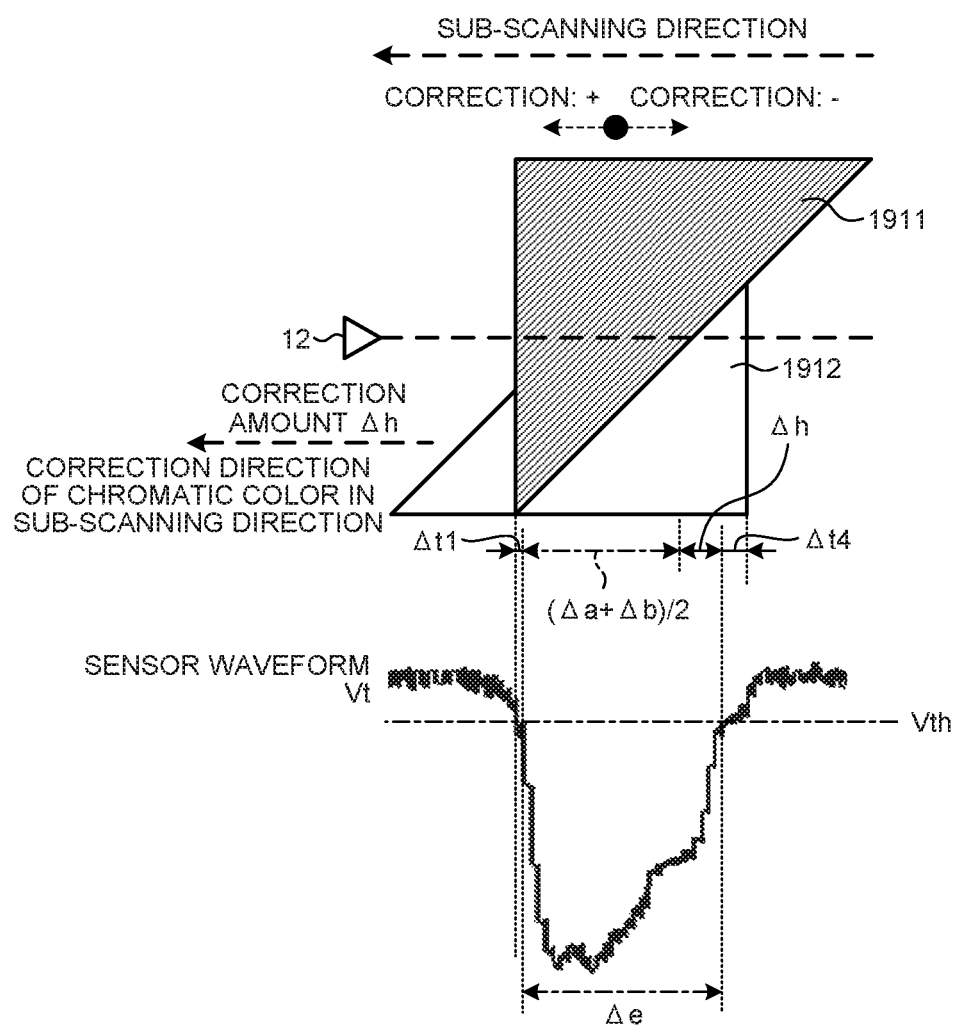
FIG. 19 is a view illustrating an example of a density sensor waveform when a chromatic color has a color shift to a negative side in a sub-scanning direction.

FIG. 19 is a view illustrating an example of a density sensor waveform when the chromatic color has the color shift to the negative side in the sub-scanning direction. An error of the detection initiation position of the correction pattern in the density sensor waveform is the same as $\Delta t1$ of FIG. 5, and an error of the detection termination position is the same as $\Delta t4$ of FIG. 6. An amount of deviation of a pattern image 1912 of a chromatic color from a pattern image 1911 of a black color is $\Delta h+\Delta t4$. Since the magnitude of $\Delta t4$ is not known, a provisional value of a correction value of the color shift in the sub-scanning direction is $\Delta h$ (=$\Delta e-(\Delta a+\Delta b)/2$).

After correction for the color shift in the sub-scanning direction is performed using first $\Delta h$, a sub-scanning color shift corresponding to $\Delta t4$ remains. Further, when second correction and third correction for the color shift in the sub-scanning direction are performed similarly to the first time, the values of $\Delta h$ and $\Delta t4$ decrease. A state at a point in time at which the correction for the color shift in the sub-scanning direction is repeatedly performed and thus $\Delta h$ (=$\Delta e-(\Delta a+\Delta b)/2$) becomes 0 is the same state as in FIG. 18, that is, the state in which there is no color shift in the sub-scanning direction.

As described above, in this modified example, the widths of pattern images of two colors that overlap at least partially are detected by the density sensor 12, a difference with the width of the black correction pattern is used as the correction value, and the correction for the color shift in the sub-scanning direction is repeatedly performed. As a result, it is possible to perform the correction for the color shift in the sub-scanning direction with a high degree of accuracy without being affected by the errors $\Delta t1$ and $\Delta t4$ of the edge portions of the pattern images.

Figure 20:
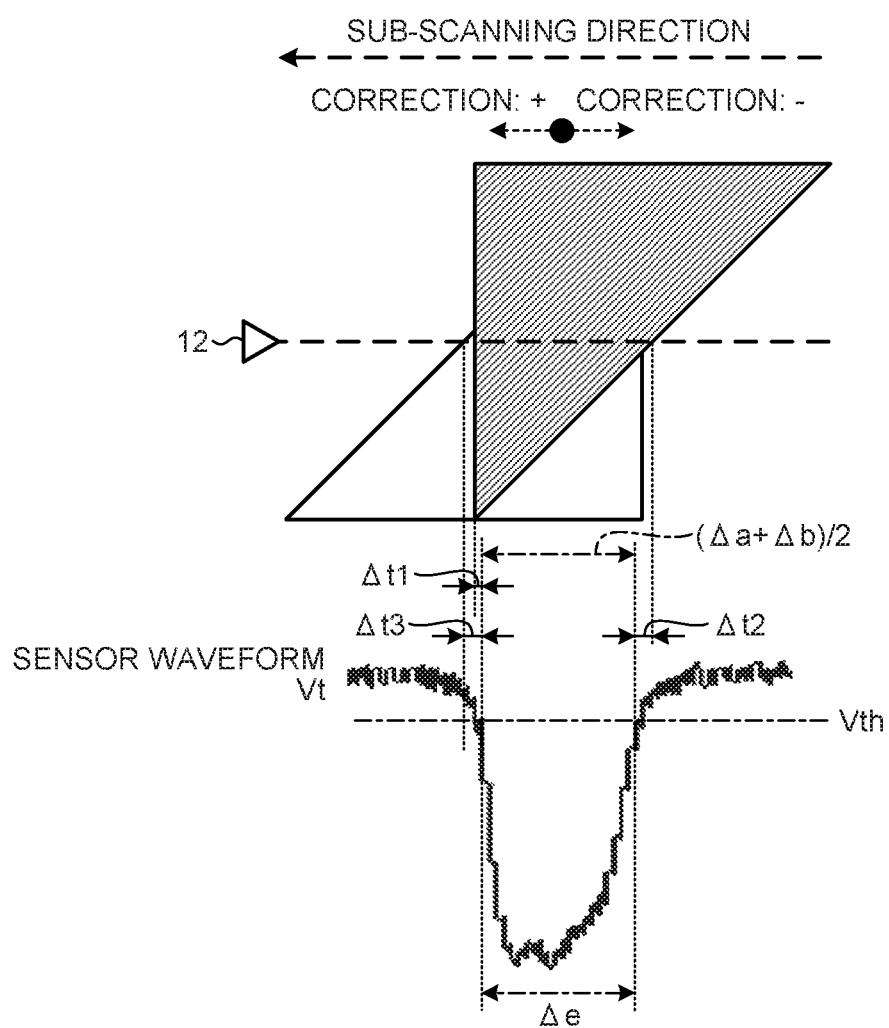
FIG. 20 is a view illustrating an example of a density sensor waveform when a chromatic color has a color shift to a positive side in a sub-scanning direction.

FIG. 20 is a view illustrating an example of the density sensor waveform when the chromatic color has the color shift to the positive side in the sub-scanning direction. The density sensor waveform of the correction pattern at the detection initiation position changes from the white color to the chromatic color. However, falling of the sensor waveform Vt of the chromatic color is gentler than that of the black color. For example, $\Delta t1 < \Delta t3$ is held as illustrated in FIG. 7 and FIG. 8. Further, as illustrated in FIG. 20, $\Delta t3$ of a change portion from the white color to the chromatic color overlaps $\Delta t1$ of a change portion from the white color to the black color, thus is masked, and becomes equal to $\Delta t1$. Thus, $\Delta h = \Delta e - (\Delta a + \Delta b)/2 \approx 0$ is held, that is, it may be difficult to detect $\Delta h$.

When the color shift of the chromatic color to the positive side in the sub-scanning direction is larger than that in FIG. 20, it is possible to detect $\Delta h$ ($=\Delta e - (\Delta a + \Delta b)/2 > 0$). However, it is difficult to determine the correction direction based on the value of the correction value $\Delta h$. Thus, for the correction for the color shift in the sub-scanning direction, it is necessary to set an initial value of the correction value so that the pattern image of the chromatic color starts at the negative side in the sub-scanning direction.

Figure 21:
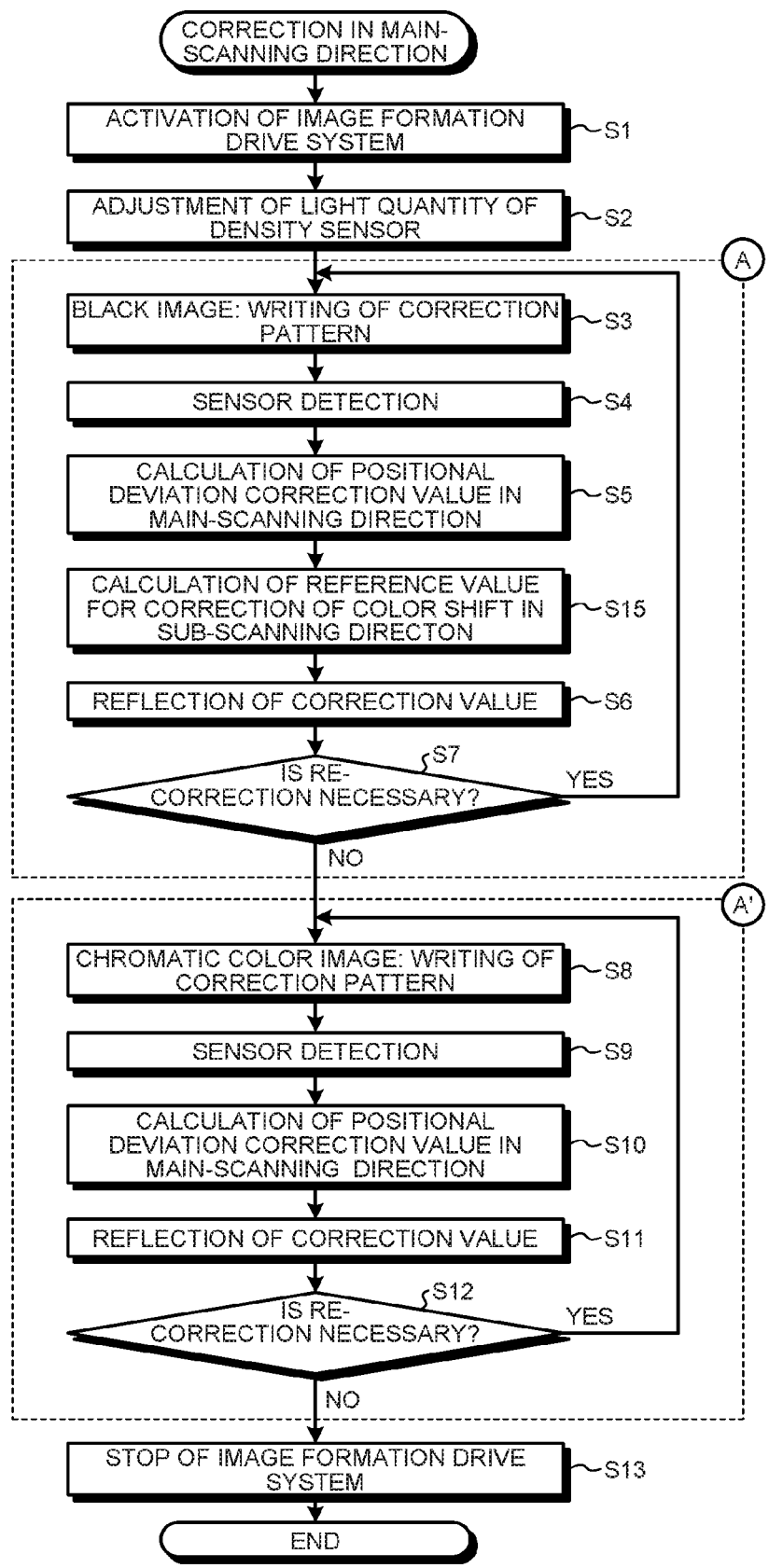
FIG. 21 is a flowchart illustrating an example of an operation of correcting a positional deviation in a main-scanning direction according to a modified example.

Next, an operation of correcting the positional deviation in the main-scanning direction according to the modified example will be described. FIG. 21 is a flowchart illustrating an example of an operation of correcting the positional deviation in the main-scanning direction according to the modified example. FIG. 21 is a flowchart when a formed image includes two colors.

The modified example differs from the above embodiment of FIG. 9 in that a process in step S15 is performed between step S5 and step S6. The remaining steps are the same and indicated by the same reference numerals, and thus a description thereof is omitted.

Step S15: Calculation of Reference Value for Correction of Color Shift in Sub-Scanning Direction As described above, the printing position calculation unit 40 calculates $(\Delta a + \Delta b)/2$, and stores the calculated value in the position information memory 41. $(\Delta a + \Delta b)/2$ stored in the position information memory 41 is read when a calculation of the correction value for the color shift in the sub-scanning direction is performed. The calculation of the reference value may be performed immediately before the correction for the color shift in the sub-scanning direction, but when the calculation of the reference value is performed at the time of correction in the main-scanning (step S15), it is unnecessary to perform the same process as step S3 and step S8 each time the correction for the color shift in the sub-scanning direction is performed. Thus, it is possible to reduce a processing time and a toner consumption amount.

Further, even when the correction value calculated in step S5 is corrected several times (step S3 to step S6), there are cases in which the correction value does not necessarily become 0. In this regard, instead of determining whether the correction value is 0, it may be determined whether the correction value is equal to or less than a threshold in step S7. For example, the engine CPU 16 may determine that re-correction is unnecessary (No in step S7) when the correction value is equal to or less than a predetermined threshold and determine that re-correction is necessary (Yes in step S7) when the correction value is larger than the threshold.

In the positional deviation correction of the chromatic color image in the main-scanning direction (step S8 to step S12), it is unnecessary to perform the process corresponding to step S15.

Figure 22:
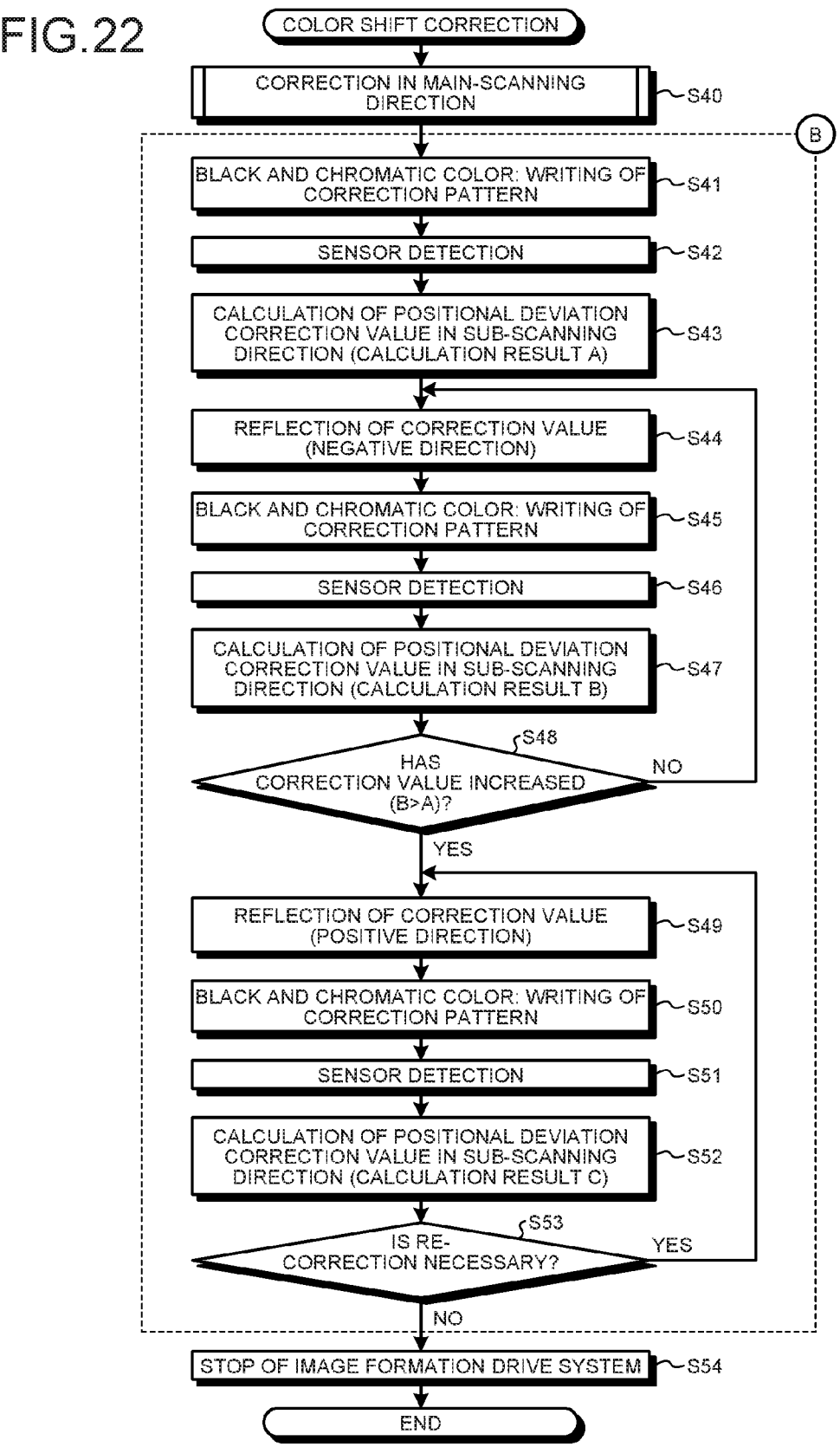
FIG. 22 is a flowchart illustrating an example of an operation of correcting a positional deviation according to a modified example.

Next, an operation of correcting the color shift in the sub-scanning direction according to the modified example will be described. FIG. 22 is a flowchart illustrating an example of an operation of correcting the positional deviation according to the modified example. FIG. 22 illustrates an example in which the correction for the color shift in the sub-scanning direction is performed after the correction for the positional deviation in the main-scanning direction is performed.

Step S40: Correction in Main-Scanning Direction

The correction for the positional deviation in the main-scanning direction is performed through the same process as step S1 to step S12 (including step S15 between step S5 and step S6) of FIG. 21.

Step S41: Writing of Correction Patterns of Black Color and Chromatic Color

The laser drive circuit 18 drives the laser 19 for black to form an electrostatic latent image of a positional deviation correction pattern for a black color on the surface of the photoconductor 1. The laser drive circuit 18 drives the laser 21 for the chromatic color to form an electrostatic latent image of a positional deviation correction pattern for the chromatic color on the surface of the photoconductor 1. Further, the positional deviation correction patterns are generated by the positional deviation correction pattern generation unit 42 of the writing control unit 14. The positional deviation correction pattern generation unit 42 generates a correction pattern including pattern images of two colors arranged, for example, as illustrated in FIG. 18. The electrostatic latent images of the positional deviation correction patterns are developed by the first developing device 4 and the second charging device 5.

Step S42: Detection of Correction Pattern

The density sensor 12 reads out the positional deviation correction patterns including the pattern images of the black color and the chromatic color formed on the photoconductor 1. A voltage signal output from the density sensor 12 is amplified by the amplification circuit 39.

Step S43: Calculation of a Positional Deviation Correction Value in the Sub-Scanning Direction (Calculation Result A)

The printing position calculation unit 40 calculates a positional deviation correction value in the sub-scanning direction based on the voltage signal received from the density sensor 12 through the amplification circuit 39. For example, the printing position calculation unit 40 calculates the correction value $\Delta h$ ($=\Delta e - (\Delta a + \Delta b)/2$) through the above-described method. The printing position calculation unit 40 stores necessary information (for example, $\Delta e$ and $\Delta h$) in the position information memory 41. The correction value calculated in step S43 is assumed to a calculation result A.

Step S44: Reflection of Correction Value (Negative Direction)

The correction value (calculation result A) is transmitted from the position information memory 41 to the engine CPU 16. The engine CPU 16 calculates final correction values for the color shift in the sub-scanning direction for two colors, that is, the black color and the chromatic color. The correction direction according to the calculation result A is the negative direction in the sub-scanning direction. The correction values for the color shift in the sub-scanning direction for the two colors are transferred from the engine CPU 16 to the buffer memory control unit 43, and read and write control timings of the buffer memory 31 at the time of subsequent output of the two-color image are decided.

Steps S45 and S46

The same process as in steps S41 and step S42 is performed.

Step S47: Calculation of Correction Value for Color Shift in the Sub-Scanning (Calculation Result B)

The same process as in step S43 is performed. The correction value calculated in step S47 is assumed to be a calculation result B.

Step S48: Determination on Whether Correction Value has Increased

The engine CPU 16 compares the calculation result A calculated in step S43 with the calculation result B calculated in step S47. When B>A is held (Yes in step S48), the color shift directions of the black color and the chromatic color before the correction value of step S44 is reflected is the negative side in the sub-scanning direction (the state in which the chromatic color pattern deviates in the same direction as in FIG. 20), and thus the color shift correction is performed in the positive direction from step S49.

When B>A is not held (No in step S48), the color shift directions of the black color and the chromatic color before the correction value of step S44 is reflected is the positive side in the sub-scanning direction (the state in which the chromatic color pattern deviates in the same direction as in FIG. 19), and thus the processes in step S44 to step S47 are repeatedly performed until the color shift correction becomes the state of the negative side in the sub-scanning direction.

Step S49: Reflection of Correction Value (Positive Direction)

The correction values (the calculation result B and a calculation result C) are transmitted from the position information memory 41 to the engine CPU 16. The calculation result C is a calculation result calculated in step S51 which will be described later. The engine CPU 16 calculates final correction values for the color shift in the sub-scanning direction for the two colors, that is, the black color and the chromatic color. The correction directions according to the calculation result B and the calculation result C are the positive direction in the sub-scanning direction. The correction values for the color shift in the sub-scanning direction for the two colors are transferred from the engine CPU 16 to the buffer memory control unit 43, and read and write control timings of the buffer memory 31 at the time of subsequent output of the two-color image are decided.

Steps S50 and S51

The same processes as in steps S41 and S42 are performed.

Step S52: Calculation of Correction Value for Color Shift in the Sub-Scanning Direction (Calculation Result C)

The same process as in step S43 is performed. The correction value calculated in step S52 is assumed to be the calculation result C.

Step S53: Determination on Whether Re-Correction is Necessary

The engine CPU 16 determines whether re-correction of $\Delta h$ ($=\Delta e-(\Delta a+\Delta b)/2$) which is the calculated correction value (the calculation result C) is necessary. For example, the engine CPU 16 determines that the re-correction is unnecessary when $\Delta h$ is 0 and determines that the re-correction is necessary when $\Delta h$ is not 0.

When the correction value is not 0 (Yes in step S53), the re-correction is necessary, and the processes in step S49 to step S52 are performed again. As described above, the engine CPU 16 determines that the re-correction is unnecessary when the correction value is equal to or less than the threshold (No in step S53) and determines that the re-correction is necessary when the correction value is larger than the threshold.

Step S54: Stop of Image Formation Drive System

The image formation drive system activated in step S40 is stopped.

Figure 23:
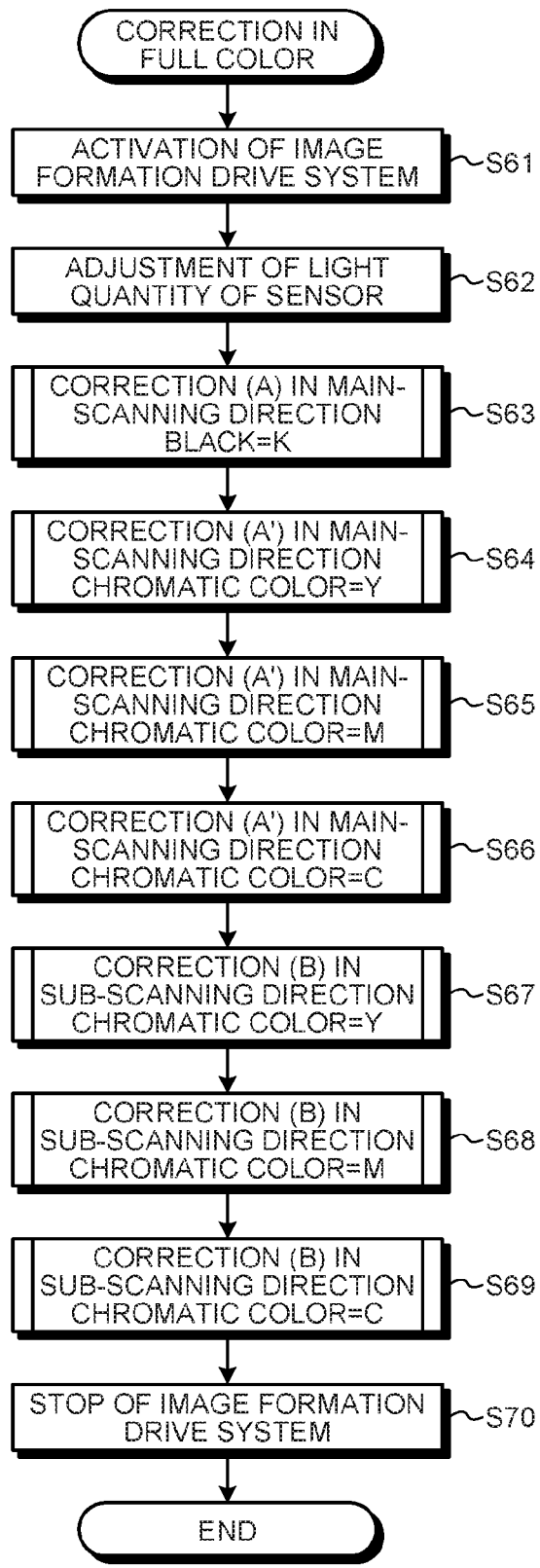
FIG. 23 is a flowchart illustrating an operation of correcting a positional deviation when a formed image includes four colors.

The example in which the chromatic color is the single color is illustrated in FIG. 22. The same process can be applied to an image forming apparatus having four colors of CMYK or five or more colors. FIG. 23 is a flowchart illustrating an operation of correcting the positional deviation when a formed image includes four colors.

Step S61: Activation Process of Image Formation Drive System

The same process as in step S1 of FIG. 13 is performed.

Step S62: Adjustment of Light Quantity of Density Sensor 12

The same process as in step S2 of FIG. 13 is performed.

Step S63: Printing Position Correction of Color (K) in the Main-Scanning Direction The same processes as in step S3 to step S7 of FIG. 21 are performed.

Step S64: Printing Position Correction of Color (Y) in the Main-Scanning Direction The same processes as in step S8 to step S12 of FIG. 21 are performed.

Step S65: Printing Position Correction of Color (M) in the Main-Scanning Direction The same processes as in step S8 to step S12 of FIG. 21 are performed.

Step S66: Printing Position Correction of Color (C) in the Main-Scanning Direction The same processes as in step S8 to step S12 of FIG. 21 are performed.

Step S67: Printing Position Correction of Color (Y) in the Sub-Scanning Direction The same processes as in step S41 to step S53 of FIG. 22 are performed.

Step S68: Printing Position Correction of Color (M) in the Sub-Scanning Direction The same processes as in step S41 to step S53 of FIG. 22 are performed.

Step S69: Printing Position Correction of Color (C) in the Sub-Scanning Direction The same processes as in step S41 to step S53 of FIG. 22 are performed.

Step S70: Stop of Image Formation Drive System

The image formation drive system activated in step S61 is stopped.

Figure 24A:
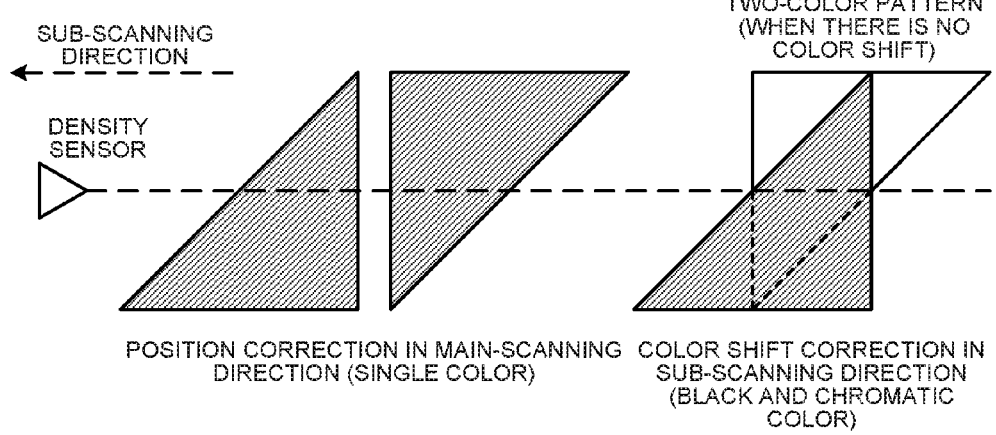
FIG. 24A is a view illustrating an example of the positional deviation correction pattern formed on the image bearer.
Figure 24B:
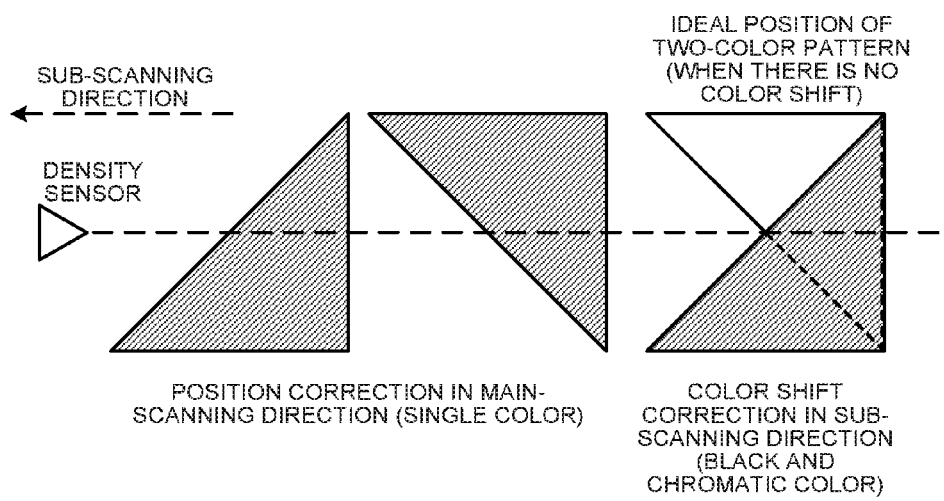
FIG. 24B is a view illustrating an example of the positional deviation correction pattern formed on the image bearer.
Figure 24C:
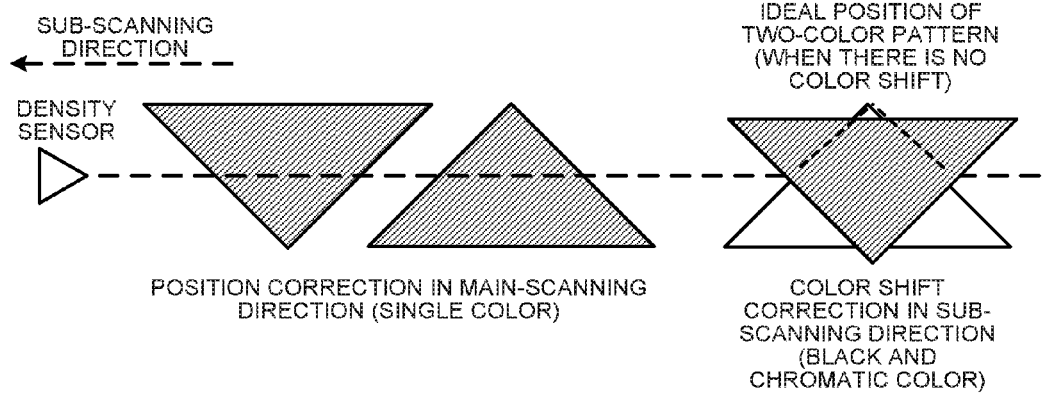
FIG. 24C is a view illustrating an example of the positional deviation correction pattern formed on the image bearer.
Figure 25A:
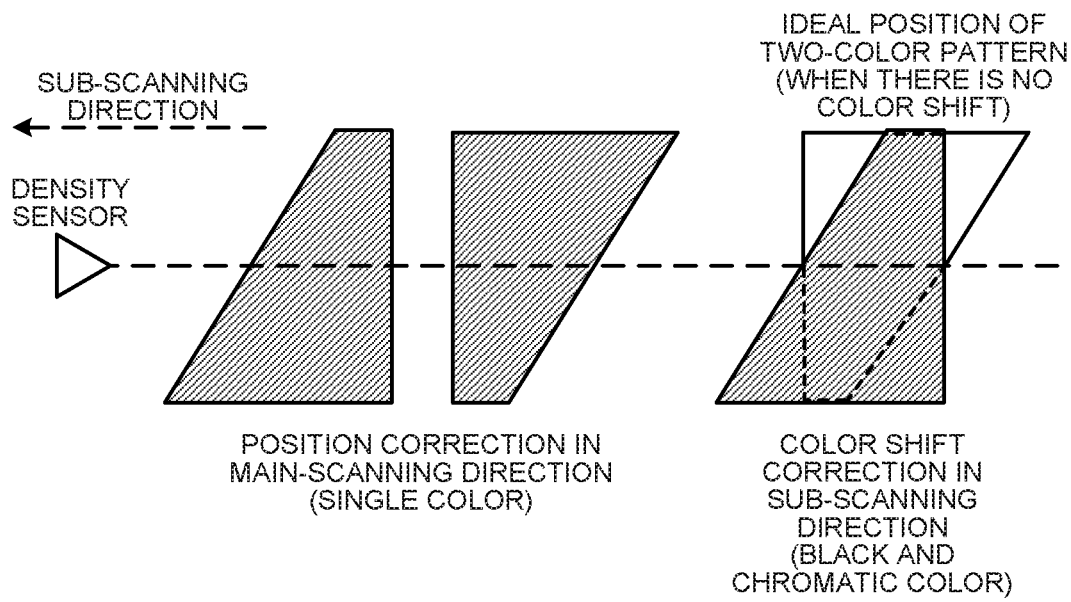
FIG. 25A is a view illustrating an example of the positional deviation correction pattern formed on the image bearer.
Figure 25B:
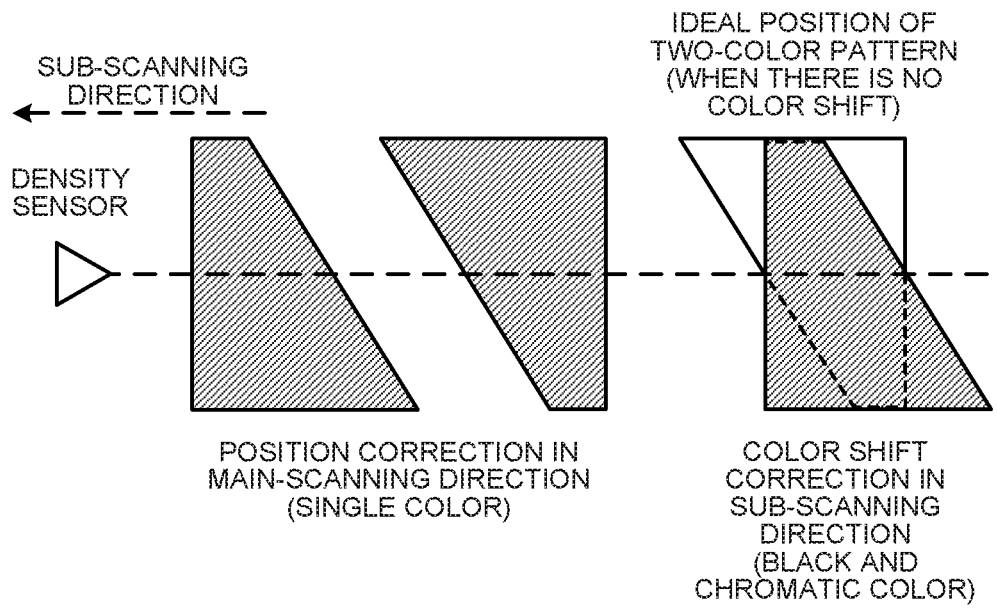
FIG. 25B is a view illustrating an example of the positional deviation correction pattern formed on the image bearer.
Figure 25C:
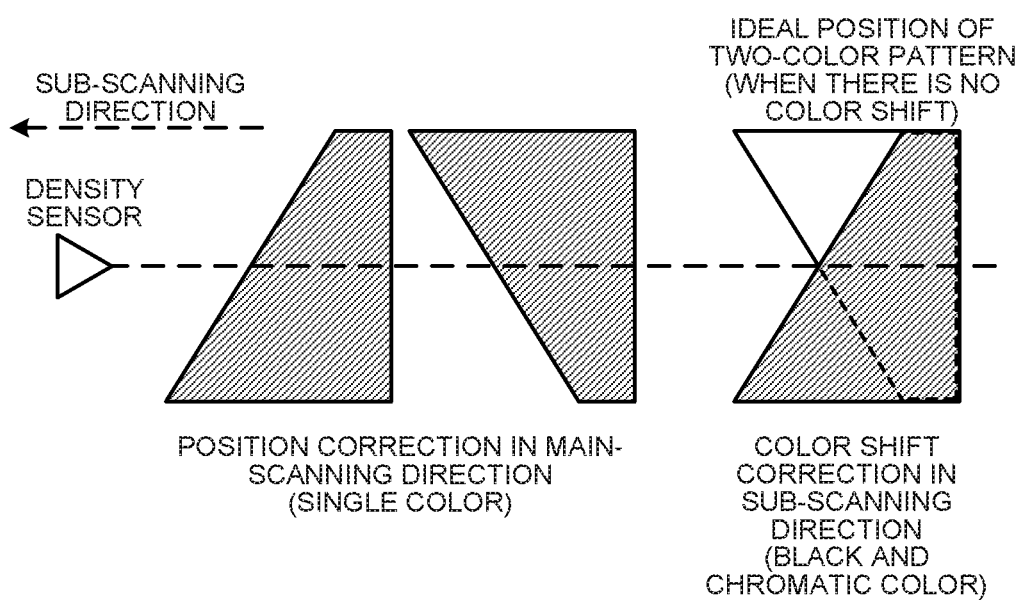
FIG. 25C is a view illustrating an example of the positional deviation correction pattern formed on the image bearer.
Figure 26B:
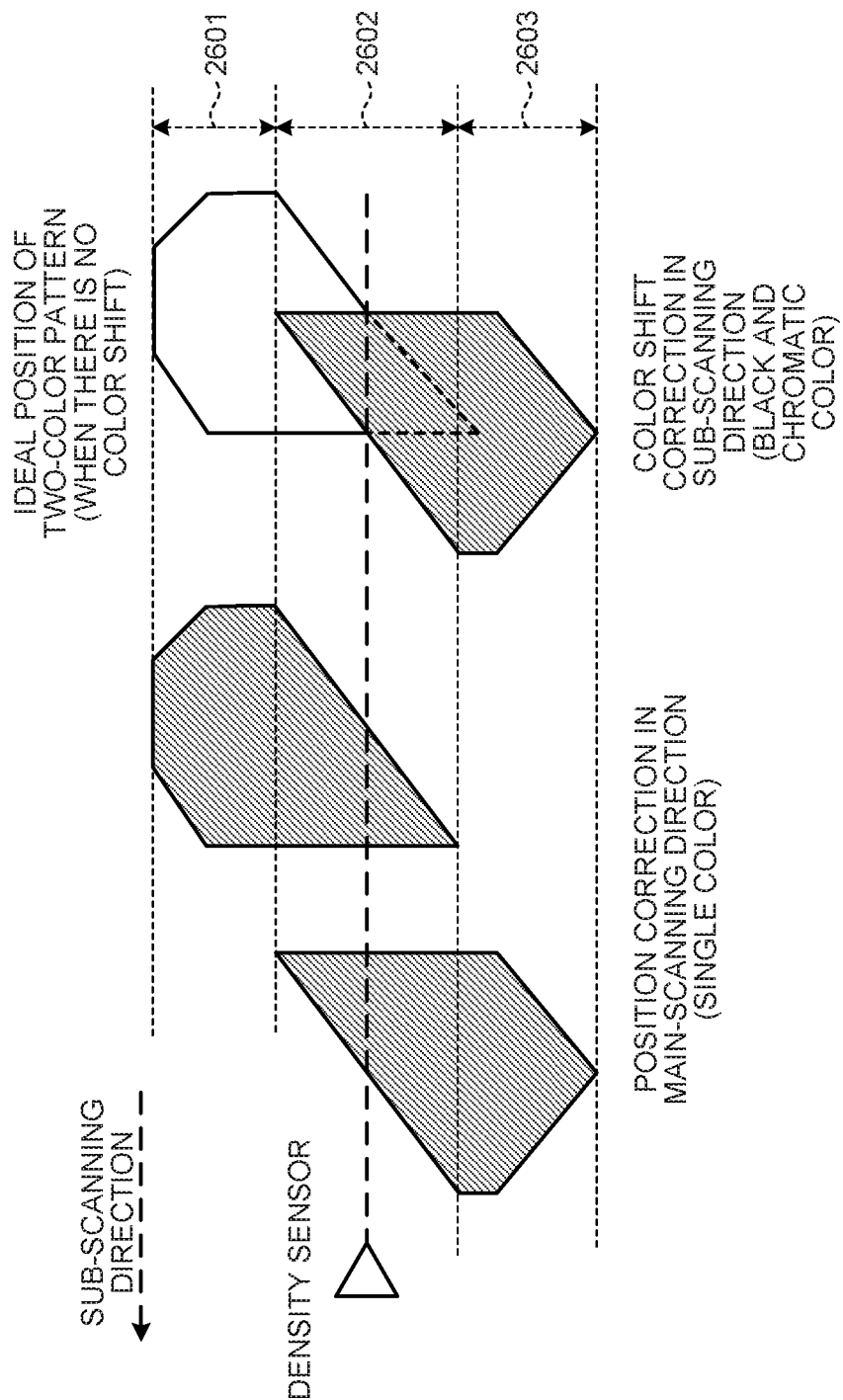
FIG. 26B is a view illustrating an example of the positional deviation correction pattern formed on the image bearer.

FIGS. 24A and 26B are views each illustrating an example of the positional deviation correction pattern formed on the image bearer. FIGS. 24A to 24C each illustrate an example of triangular patterns, and FIGS. 25A to 25C illustrate example of rectangular patterns. FIGS. 26A and 26B each illustrate an example of a correction pattern having a portion that is not used for the positional deviation correction. FIGS. 24A and 26B correspond to FIGS. 14A to 16B described above. In each drawing, a pattern image (left) used for the correction for the positional deviation in the main-scanning direction and a pattern image (right) used for the correction for the color shift in the sub-scanning direction are illustrated.

For example, two pattern images of each drawing which are drawn on a subject in a single correction process are common in the following points:

(1) the two pattern images are the same in the width in the sub-scanning direction at a predetermined position in the main-scanning direction.

(2) the pattern images are sold-filled at a density detectable by the density sensor 12;

(3) at least one side of each of the two pattern images is in parallel in the sub-scanning direction;

(4) at least one of the sides excluding the side that is in parallel in the sub-scanning direction has the same inclination angle with respect to a perpendicular line in the sub-scanning direction;

(5) the widths of the two pattern images in the sub-scanning direction gradually decreases as it moves to one side in the main-scanning direction and gradually increases as it moves to the other side in the main-scanning direction;

(6) in the correction of each color for the positional deviation in the main-scanning direction, the two pattern images are drawn in the same color not to overlap each other;

(7) in the sub-scanning color shift correction between different colors, the two pattern images are drawn in two colors of a color shift correction target to overlap each other;

(8) at the ideal positions of the density sensor 12 illustrated in FIGS. 24A to 26B, the widths of the two pattern images in the sub-scanning direction are the same; and (9) the correction in the main-scanning direction is performed in the positive direction or the negative direction, and there is no restriction to the shape of the other pattern image outside a position at which one of the pattern images leaves the sensor detection position (i.e., portions of the two pattern images that do not overlap each other when viewed in the sub-scanning direction are not necessary for the positional deviation correction in the main-scanning direction, and thus it is unnecessary to restrict the shape thereof).

FIGS. 26A and 26B each illustrate an example of a pattern image having a portion whose shape is no restricted as in (9) described above. For example, in ranges indicated by arrows 2601 and 2603 of FIG. 26B, there is no restriction to the shape of the pattern image. A range indicated by an arrow 2602 is a region in which the two pattern images overlap when viewed in the sub-scanning direction and a portion in which correction is necessary.

When the above conditions (1) to (9) are satisfied, it is possible to detect the widths of the two pattern images overlapping each other with the density sensor 12 and calculate the printing position correction values in the main-scanning direction and the sub-scanning direction.

Summary of Operations and Effects

First Aspect

According to the first aspect, there is provided a positional deviation correction pattern 100 formed on an image bearer by an image forming unit provided in an image forming apparatus. The positional deviation correction pattern 100 includes a first pattern image portion 111 and a second pattern image portion 121. The first and second pattern image portions 111 and 121 are disposed to be adjacent to each other in a sub-scanning direction of the image bearer; are solid-filled; are disposed in the same position in a main-scanning direction; have the same width in the main-scanning direction; and include first sides 116 and 126 which extend in parallel with the sub-scanning direction, second sides 117 and 127 which continue from one end of the respective first sides and extend in a direction that intersects the sub-scanning direction, and third sides 118 and 128 which continue from the other ends of the respective first sides and extend in a direction that intersects both the sub-scanning direction and the second side. The second sides of the first and second pattern image portions have the same inclination angle θ and ϕ with respect to a virtual line parallel to the main-scanning direction, and the third sides of the first and second pattern image portions have the same inclination angle with respect to the virtual line. When a length of one of the first and second pattern image portions in the sub-scanning direction gradually increases from one end to the other end in the main-scanning direction, a length of the other of the first and second pattern image portions in the sub-scanning direction gradually decreases.

Here, the image forming apparatus includes an inkjet recording type image forming apparatus and the like in addition to the electrophotographic type image forming apparatus, and the image forming unit is an image forming unit that corresponds to image formation of each type. In addition, the image bearer may bear an image and includes a recording medium such as a recording sheet. In a case of the electrophotographic type image forming apparatus, the image bearer includes a photoconductor, an intermediate transfer body to which an image is transferred from the photoconductor, and the like.

The positional deviation correction pattern constituted by the first pattern image portion and the second pattern image portion according to the first aspect has a shape with which a positional deviation in the main-scanning direction can be calculated from a difference in the length in the sub-scanning direction. In addition, the positional deviation correction pattern includes a pair of pattern image portions which are disposed to be adjacent to each other in the sub-scanning direction. Accordingly, in the pattern detection sensor, it is possible to cancel an error that occurs at a transition portion from the background portion to the pattern image portion, and an error that occurs at a transition portion the pattern image portion to the background portion. That is, it is possible to reduce a position detection error due to quality of a sensor waveform. As a result, it is not necessary to use an expensive color sensor such as a CCD and a CMOS sensor, and thus it is possible to reduce the cost related to a sensor that detects the pattern image portion.

Second Aspect

According to the second aspect, the first pattern image portion 111 and the second pattern image portion 121 are figures having the same shape which overlap each other when being rotated or inverted.

According to the second aspect, the positional deviation d is obtained based on an actually measured value of the pattern detection sensor regardless of the length of the first sides 116 and 126 which extend in parallel with the sub-scanning direction.

Third Aspect

According to the third aspect, the first and second pattern image portions 111 and 121 are figures in which the second sides 117 and 127 are parallel to the main-scanning direction, and the third sides 118 and 128 are inclined with respect to the main-scanning direction by 45°.

According to the third aspect, an error of the positional deviation d obtained through calculation is reduced.

Fourth Aspect

According to the fourth aspect, there is provided a method of forming a positional deviation correction pattern which is executed by an image forming apparatus including an image forming unit that forms an image on an image bearer. The method includes forming the positional deviation correction pattern on the image bearer by the image forming unit.

The fourth aspect provides the same effect as in the first to third aspects.

Fifth Aspect

According to the fifth aspect, there is provided an image forming apparatus including the image forming unit that forms the positional deviation correction pattern on an image bearer.

The fifth aspect provides the same effect as in the first to third aspects.

Sixth Aspect

According to the sixth aspect, the image forming apparatus further includes a plurality of the image forming units (a first image forming unit, a second image forming unit, . . . ) which forms images having colors different from each other on the image bearer. The respective image forming units form positional deviation correction patterns of respective colors on the image bearer in such a manner that the positional deviation correction patterns do not overlap each other.

The present invention is also applicable to a monochromatic image forming apparatus, but also an image forming apparatus that forms a color image by overlapping a plurality of colors. In a case of the former, it is possible to reduce the positional deviation of an image formed on the image bearer. In a case of the latter, it is possible to reduce a color shift of respective images which are overlapped on the image bearer. The number of colors which are formed on the image bearer by the image forming apparatus is not particularly limited. In a case where positional deviation correction patterns of respective colors are formed, as illustrated in flowcharts of FIG. 9 or FIG. 13, the positional deviation correction pattern is formed for each color, and the positional deviation correction value is calculated for each color. Accordingly, the positional deviation correction patterns of respective colors are formed on the image bearer in such a manner that the positional deviation correction patterns do not overlap each other.

Seventh Aspect

According to the seventh aspect, the image forming apparatus further includes a pattern detection unit that detects a length of each of the pattern image portions in the sub-scanning direction which are formed on the image bearer, and a positional deviation correction amount calculating unit that calculates a correction amount of a positional deviation with respect to an ideal drawing position in the main-scanning direction of an image formed by the image forming unit based on the length of the pattern image portion in the sub-scanning direction detected by the pattern detection unit.

According to the seventh aspect, as is the case with the first to third aspects, it is possible to reduce a positional detection error due to quality of the sensor waveform. As a result, it is not necessary to use an expensive color sensor such as a CCD and a CMOS sensor, and thus it is possible to reduce the cost related to a sensor that detects the pattern image portion.

Eighth Aspect

In the image forming apparatus according to the eighth aspect, the pattern detection unit includes a light-emitting unit that irradiates the pattern image formed on the image bearer with light, and a light-receiving unit that receives light reflected from the pattern image.

The pattern detection unit in the eighth aspect is a typical reflective photo-sensor. For example, this detection unit is already mounted as a density sensor, which detects a toner density, in the electrophotographic type image forming apparatus. That is, the density sensor can also be used as the pattern detection unit, and thus it is possible to reduce the cost.

Ninth Aspect

In the image forming apparatus according to the ninth aspect, the ideal drawing position of the positional deviation correction pattern is a position at which the pattern detection unit detects the center of each of the pattern image portions in the main-scanning direction.

In the ninth aspect, particularly, when the first and second pattern image portions 111 and 121 have the same overlapping shape when being rotated or inverted, the length of the two pattern image portions in the sub-scanning direction at the center in the main-scanning direction is the same in each case, and thus determination on the positional deviation becomes easy.

Tenth Aspect

In the image forming apparatus according to the tenth aspect, the image bearer is any one of a recording medium, a photoconductor provided to an electrophotographic type image forming apparatus, and an intermediate transfer body to which an image is transferred from the photoconductor.

The invention is widely applicable to various image forming apparatuses.

According to the invention, it is possible to detect a positional deviation of an image with accuracy in a simple configuration.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A set of positional deviation correction patterns to be formed on an image bearer by an image forming unit provided in an image forming apparatus, comprising:
   a first pattern and a second pattern that:
      are adjacent to each other in a sub-scanning direction of the image bearer,
      are solid-filled, and
      have a same length in a sub-scanning direction, at a same position in a main-scanning direction;
   a third pattern that is solid-filled with a set color; and
   a fourth pattern that is solid-filled with a color different from the set color of the third pattern and overlaps partially with the third pattern, wherein:
      a length in the sub-scanning direction of an overlapping portion where the third pattern and the fourth pattern substantially overlap each other in the sub-scanning direction is the same as a length of the first pattern and the second pattern in the sub-scanning direction at the same position in the main-scanning direction,
      when a length of one of the first and second patterns in the sub-scanning direction from one end in the sub-scanning direction to another end in the sub-scanning direction increases from one end to the other end in the main-scanning direction, a length of the other of the first and second patterns in the sub-scanning direction from one end in the sub-scanning direction to another end in the sub-scanning direction decreases, and
      when a length of one of the third and fourth patterns in the sub-scanning direction from one end in the sub-scanning direction to another end in the sub-scanning direction increases from one end to the other end in the main-scanning direction, a length of the other of the third and fourth patterns in the sub-scanning direction from one end in the sub-scanning direction to another end in the sub-scanning direction decreases.

2. The set of positional deviation correction patterns according to claim 1, wherein the first pattern and the second pattern are figures having the same shape which overlap each other when being rotated or inverted.

3. A method of forming a set of positional deviation correction patterns which is executed by an image forming apparatus including an image forming unit that forms an image on an image bearer, the method comprising:
   forming the set of positional deviation correction patterns according to claim 1 on the image bearer by the image forming unit.

4. An image forming apparatus, comprising:
   an image forming unit that forms the set of positional deviation correction patterns according to claim 1 on an image bearer.

5. The image forming apparatus according to claim 4, further comprising
   a pattern detection unit configured to detect a length of each of the patterns in the sub-scanning direction which are formed on the image bearer; and
   a processor, via a positional deviation correction amount calculating unit, configured to calculate a correction amount of a positional deviation with respect to an ideal drawing position in the main-scanning direction of an image formed by the image forming unit based on the length of the pattern in the sub-scanning direction detected by the pattern detection unit.

6. The image forming apparatus according to claim 5, wherein the pattern detection unit comprises:
   a light-emitting unit configured to irradiate the pattern image formed on the image bearer with light; and
   a light-receiving unit configured to receive light reflected from the pattern image.

7. The image forming apparatus according to claim 5, wherein the ideal drawing position of the positional deviation correction pattern is a position at which the pattern detection unit is configured to detect a center of each of the patterns in the main-scanning direction.

8. The image forming apparatus according to claim 4, wherein the image bearer is any one of a recording medium, a photoconductor provided in an electrophotographic type image forming apparatus, and an intermediate transfer body to which an image is transferred from the photoconductor.

9. The set of positional deviation correction patterns according to claim 1, wherein each of the first pattern and the second pattern includes:
   a first side that extends in parallel with the sub-scanning direction,
   a second side that continues from one end of the first side and extends in a direction that intersects the sub-scanning direction, and
   a third side that continues from the other end of the first side and extends in a direction that intersects both the sub-scanning direction and the second side.

10. The set of positional deviation correction patterns according to claim 9, wherein the second sides of the first and second patterns have the same inclination angle with respect to a virtual line parallel to the main-scanning direction, and the third sides of the first and second patterns have the same inclination angle with respect to the virtual line.

11. The set of positional deviation correction patterns according to claim 9, wherein the first and second patterns are figures in which the second side is parallel to the main-scanning direction, and the third side is inclined with respect to the main-scanning direction by 45°.

12. The set of positional deviation correction patterns according to claim 1, wherein the set of positional deviation correction patterns of respective colors are formed on an image bearer such that the first pattern and the second pattern do not overlap each other.

13. An image forming apparatus, comprising:
   an image forming unit that forms a set of positional deviation correction patterns on an image bearer, the set of positional deviation correction patterns including,
   a first pattern, and a second pattern that:
      are adjacent to each other in a sub-scanning direction of the image bearer,
      are solid-filled, and
      have a same length in a sub-scanning direction, at a same position in a main-scanning direction;
   a third pattern that is solid-filled with a set color; and
   a fourth pattern that is solid-filled with a color different from the set color of the third pattern and overlaps partially with the third pattern, wherein:
      a length in the sub-scanning direction of an overlapping portion where the third pattern and the fourth pattern substantially overlap each other in the sub-scanning direction is the same as a length of the first pattern and the second pattern in the sub-scanning direction at the same position in the main-scanning direction,
      when a length of one of the first and second patterns in the sub-scanning direction from one end in the sub-scanning direction to another end in the sub-scanning direction increases from one end to the other end in the main-scanning direction, a length of the other of the first and second patterns in the sub-scanning direction from one end in the sub-scanning direction to another end in the sub-scanning direction decreases, and
      when a length of one of the third and fourth patterns in the sub-scanning direction from one end in the sub-scanning direction to another end in the sub-scanning direction increases from one end to the other end in the main-scanning direction, a length of the other of the third and fourth patterns in the sub-scanning direction from one end in the sub-scanning direction to another end in the sub-scanning direction decreases
      the image forming unit includes a plurality of image forming units which form images having colors different from each other on the image bearer, and
      the plurality of image forming units form the set of positional deviation correction patterns of respective colors on the image bearer in such a manner that the first pattern and the second pattern do not overlap each other.

* * * * *